US012776490B2

(12) United States Patent
Fujita et al.

(10) Patent No.: US 12,776,490 B2
(45) Date of Patent: Oct. 27, 2026

(54) COMPOSITE PARTICLE, METHOD FOR PRODUCING THE SAME, AND APPLICATIONS THEREOF

(71) Applicant: Group14 Technologies, Inc., Woodinville, WA (US)

(72) Inventors: Masato Fujita, Tokyo (JP); Kunihiro Kojima, Tokyo (JP); Yuji Ito, Tokyo (JP); Hirofumi Inoue, Tokyo (JP)

(73) Assignee: Group14 Technologies, Inc., Woodinville, WA (US)

( * ) Notice: Subject to any disclaimer, the term of this patent is extended or adjusted under 35 U.S.C. 154(b) by 397 days.

(21) Appl. No.: 18/565,795

(22) PCT Filed: Apr. 15, 2022

(86) PCT No.: PCT/JP2022/017905

§ 371 (c)(1),
(2) Date: Nov. 30, 2023

(87) PCT Pub. No.: WO2023/053548

PCT Pub. Date: Apr. 6, 2023

(65) Prior Publication Data

US 2024/0266535 A1 Aug. 8, 2024

(30) Foreign Application Priority Data

Oct. 1, 2021 (JP) ................................ 2021-163086

(51) Int. Cl.

| | |
|---|---|
| ***H01M 4/583*** | (2010.01) |
| ***H01M 4/02*** | (2006.01) |
| ***H01M 4/04*** | (2006.01) |
| ***H01M 4/36*** | (2006.01) |
| ***H01M 4/38*** | (2006.01) |
| ***H01M 4/62*** | (2006.01) |
| ***H01M 10/0525*** | (2010.01) |

(52) U.S. Cl.

CPC ......... *H01M 4/583* (2013.01); *H01M 4/0421* (2013.01); *H01M 4/364* (2013.01); *H01M 4/366* (2013.01); *H01M 4/386* (2013.01); *H01M 4/622* (2013.01); *H01M 4/625* (2013.01); *H01M 10/0525* (2013.01); *H01M 2004/021* (2013.01); *H01M 2004/027* (2013.01)

(58) Field of Classification Search

CPC .... H01M 4/583; H01M 4/0421; H01M 4/364; H01M 4/366; H01M 4/386; H01M 4/622; H01M 4/625; H01M 10/0525; H01M 2004/021; H01M 2004/027; H01M 4/134; H01M 4/38; H01M 4/48; H01M 4/62; H01M 4/36; H01M 4/587; H01M 4/362; C01B 33/02; C01B 32/05; C01B 33/027; Y02E 60/10; C01P 2002/74; C01P 2002/82; C01P 2002/85; C01P 2004/61

See application file for complete search history.

(56) References Cited

U.S. PATENT DOCUMENTS

| | | | | |
|---|---|---|---|---|
| 6,631,073 | B1 | 10/2003 | Sakata et al. | |
| 7,037,581 | B2 | 5/2006 | Aramata et al. | |
| 7,618,678 | B2 | 11/2009 | Mao et al. | |
| 10,147,950 | B2 | 12/2018 | Sakshaug et al. | |
| 10,424,786 | B1 | 9/2019 | Mason et al. | |
| 12,148,919 | B2 | 11/2024 | Kurita et al. | |
| 12,494,479 | B2 * | 12/2025 | Takeda | C01B 32/372 |
| 2012/0264020 | A1 | 10/2012 | Burton et al. | |
| 2013/0004841 | A1 | 1/2013 | Thompkins et al. | |
| 2013/0130115 | A1 | 5/2013 | Park et al. | |
| 2013/0280601 | A1 | 10/2013 | Geramita et al. | |
| 2013/0344391 | A1 * | 12/2013 | Yushin | H01M 4/386 429/218.1 |
| 2014/0255673 | A1 * | 9/2014 | Peterson | C09D 5/00 428/698 |

(Continued)

FOREIGN PATENT DOCUMENTS

| | | | |
|---|---|---|---|
| CN | 101609891 | A | 12/2009 |
| CN | 102214823 | A | 10/2011 |

(Continued)

OTHER PUBLICATIONS

Lieu et al., "Utilization of impurities and carbon defects in natural microcrystalline graphite to prepare silicon-graphite composite anode for high-performance lithium-ion batteries," Journal of Material Science 56(31):17682-17693, Jul. 29, 2021.

Mazzoli et al., "Particle size, size distribution and morphological evaluation of airborne dust particles of diverse woods by Scanning Electron Microscopy and image processing program," Powder Technology 225:65-71, Mar. 30, 2012. (7 pages).

Xu et al., "Comparison of sizing small particles using different technologies," Powder Technology 132:145-153, Jun. 24, 2003 [Published online Apr. 4, 2003]. (9 pages).

Zou et al., "Development and optimization of porosity measurement techniques," Ceramics International 42:2861-2870, 2016 [Published online Nov. 12, 2015]. (10 pages).

*Primary Examiner* — Muhammad S Siddiquee
(74) *Attorney, Agent, or Firm* — Seed Intellectual Property Law Group LLP

(57) ABSTRACT

A composite particle includes a particle including a carbon material and silicon, and a coating layer including carbon and oxygen on the surface of the particle, in which the composite particle has a true density of 1.80 to 1.99 g/cm$^3$; in the Raman spectrum, a peak is present at 450 to 495 cm$^{-1}$, and when the intensity of the peak is defined as $I_{Si}$ and the intensity of the G band is defined as $I_G$, $I_{Si}/I_G$ is 1.3 or less; and when the ratios of the number of atoms of Si, O, and C in X-ray photoelectron spectroscopy are defined as $A_{Si}$, $A_O$, and $A_C$, respectively, and the ratios of $SiO_2$ and SiO are defined as $B_{SiO2}$ and $B_{SiO}$, respectively, $A_{Si}$ is 0.05 or more, and $I_{Si}/I_G$ and $A_C/(A_C+A_{Si}\times(B_{SiO2}+B_{SiO}))$ have predetermined relationships.

16 Claims, No Drawings

(56) References Cited

U.S. PATENT DOCUMENTS

| | | | |
|---|---|---|---|
| 2014/0272592 | A1 | 9/2014 | Thompkins et al. |
| 2017/0152340 | A1 | 6/2017 | Geramita et al. |
| 2017/0170477 | A1 | 6/2017 | Sakshaug et al. |
| 2017/0187032 | A1 | 6/2017 | Chang et al. |
| 2017/0346084 | A1 | 11/2017 | Sakshaug et al. |
| 2018/0151268 | A1* | 5/2018 | Matsuura .............. B32B 17/061 |
| 2018/0248178 | A1 | 8/2018 | Chan et al. |
| 2018/0273764 | A1* | 9/2018 | Sasaki .................. C01B 33/149 |
| 2019/0027781 | A1 | 1/2019 | Lee et al. |
| 2019/0267622 | A1 | 8/2019 | Sakshaug et al. |
| 2019/0355971 | A1 | 11/2019 | Kim |
| 2020/0020935 | A1 | 1/2020 | Costantino et al. |
| 2020/0044241 | A1* | 2/2020 | Gigler ................. H01M 4/1395 |
| 2020/0152973 | A1 | 5/2020 | Mason et al. |
| 2022/0376263 | A1 | 11/2022 | Albano et al. |
| 2023/0216025 | A1* | 7/2023 | Takeda .................. C01B 32/372 252/182.1 |
| 2023/0231111 | A1* | 7/2023 | Kurita ..................... C01B 32/05 252/511 |
| 2024/0322162 | A1* | 9/2024 | Hirose ................ H01M 4/5825 |

FOREIGN PATENT DOCUMENTS

| | | | |
|---|---|---|---|
| CN | 205893385 | U | 1/2017 |
| CN | 108475779 | A | 8/2018 |
| CN | 108511686 | A | 9/2018 |
| CN | 108565437 | A | 9/2018 |
| CN | 109004203 | A | 12/2018 |
| CN | 109216686 | A | 1/2019 |
| CN | 109585781 | A | 4/2019 |
| CN | 110088949 | A | 8/2019 |
| CN | 112582589 | A | 3/2021 |
| CN | 113066968 | A | 7/2021 |
| EP | 3653576 | A2 | 5/2020 |
| EP | 3667782 | A1 | 6/2020 |
| GB | 2578797 | | 5/2020 |
| GB | 2584615 | A | 12/2020 |
| JP | 11339796 | A | 12/1999 |
| JP | 2002141069 | A | 5/2002 |
| JP | 2005025991 | | 1/2005 |
| JP | 2007008790 | A | 1/2007 |
| JP | 2007039289 | A | 2/2007 |
| JP | 3897709 | B2 | 3/2007 |
| JP | 2007234358 | A | 9/2007 |
| JP | 2008112710 | A | 5/2008 |
| JP | 2008251221 | A | 10/2008 |
| JP | 2009049236 | A | 3/2009 |
| JP | 2009526743 | A | 7/2009 |
| JP | 2009289417 | A | 12/2009 |
| JP | 2010095390 | A | 4/2010 |
| JP | 2010525549 | A | 7/2010 |
| JP | 2010277989 | A | 12/2010 |
| JP | 2012119079 | A | 6/2012 |
| JP | 2014511322 | A | 5/2014 |
| JP | 2014514683 | A | 6/2014 |
| JP | 2014523468 | A | 9/2014 |
| JP | 2015050050 | A | 3/2015 |
| JP | 2015069762 | A | 4/2015 |
| JP | 2015130287 | A | 7/2015 |
| JP | 2016132608 | A | 7/2016 |
| JP | 2016166116 | A | 9/2016 |
| JP | 2017088443 | A | 5/2017 |
| JP | 2017222547 | A | 12/2017 |
| JP | 2018032588 | A | 3/2018 |
| JP | 6328107 | B2 | 5/2018 |
| JP | 2018163776 | | 10/2018 |
| JP | 2018-534720 | A | 11/2018 |
| JP | 2019145212 | A | 8/2019 |
| JP | 2019522872 | A | 8/2019 |
| JP | 2019179679 | A | 10/2019 |
| JP | 2020537324 | A | 12/2020 |
| JP | 2021-187708 | A | 12/2021 |
| KR | 20140112451 | A | 9/2014 |
| KR | 101560892 | B1 | 10/2015 |
| KR | 10-2018-0113187 | A | 10/2018 |
| KR | 10-2019-0122805 | A | 10/2019 |
| KR | 20200013097 | A | 2/2020 |
| WO | 2008081883 | A1 | 7/2008 |
| WO | 2013106782 | A2 | 7/2013 |
| WO | 2013192205 | A1 | 12/2013 |
| WO | 2014160385 | A2 | 10/2014 |
| WO | 2015019994 | A1 | 2/2015 |
| WO | 2016009938 | A1 | 1/2016 |
| WO | 2017040299 | | 3/2017 |
| WO | 2018163778 | A1 | 9/2018 |
| WO | 2019031597 | | 2/2019 |
| WO | 2019131861 | A1 | 7/2019 |
| WO | 2019131862 | A1 | 7/2019 |
| WO | 2020095067 | A1 | 5/2020 |
| WO | 2020128523 | A1 | 6/2020 |
| WO | 2021091789 | A1 | 5/2021 |

* cited by examiner

COMPOSITE PARTICLE, METHOD FOR PRODUCING THE SAME, AND APPLICATIONS THEREOF

CROSS REFERENCE TO RELATED APPLICATIONS

This application is a National Stage of International Application No. PCT/JP2022/017905 filed Apr. 15, 2022, claiming priority based on Japanese Patent Application No. 2021-163086 filed Oct. 1, 2021.

TECHNICAL FIELD

The present invention relates to a composite particle, a method for producing the same, and applications thereof.

BACKGROUND ART

Lithium-ion secondary batteries used in IT devices such as smartphones and tablet PCs, vacuum cleaners, electric tools, electric bicycles, drones, and automobiles require negative electrode active materials with high capacity and high output. Silicon (theoretical specific capacity: 4200 mAh/g), which has a higher theoretical specific capacity than currently used graphite (theoretical specific capacity: 372 mAh/g), has attracted attention as a negative electrode active material.

However, silicon (Si) expands and contracts in association with electrochemical insertion and deinsertion of lithium, and its volume at the time of expansion is up to about 3 to 4 times larger than its volume at the time of contraction. As a result, the silicon particles collapse or are separated from the electrode, and thus it is known that lithium-ion secondary batteries using silicon have extremely low cycle characteristics. For this reason, instead of simply replacing graphite with silicon, it is now being actively studied to use a structure in which the degree of expansion and contraction of the negative electrode active material as a whole is reduced. Among them, many attempts have been made to form a composite with carbonaceous materials.

As a high-capacity and long-life negative electrode active material, for example, Patent Literature 1 discloses a silicon-carbon composite material (Si—C composite material) obtained by a method in which porous carbon particles are brought into contact with silane gas under high temperature, thereby producing silicon in the pores of the porous carbon. Patent Literature 1 also discloses a material in which the Si—C composite material is further coated with a carbon layer by the chemical vapor deposition (CVD) method.

CITATION LIST

Patent Literature

Patent Literature 1: JP2018-534720A

SUMMARY OF INVENTION

Technical Problem

Unlike carbon materials conventionally used as negative electrode active materials, such as graphite, silicon is oxidized when it comes into contact with an oxidizing agent such as oxygen or water. When silicon containing silicon oxide produced by this oxidation is used as the negative electrode active material, silicon oxide reacts with lithium to produce lithium silicate. Lithium silicate causes irreversible capacity. Generally, negative electrode active materials come into contact with air or water when producing electrodes. Also, negative electrode active materials and electrodes using the same may be stored in the air. Accordingly, it is preferable to use a negative electrode active material with suppressed oxidation of silicon.

When the material disclosed in Patent Literature 1, which is a Si—C composite material coated with carbon by the CVD method, is used as the negative electrode active material, according to the investigations by the present inventors, oxidative degradation can be suppressed, but the silicon utilization rate and coulombic efficiency are reduced. The silicon utilization rate represents the ratio of the capacity per silicon content in the negative electrode active material to the theoretical specific capacity of silicon (4200 mAh/g). When the silicon utilization rate is low, more Si—C composite material is needed to increase capacity, and therefore, it is preferable for the silicon utilization rate to be as high as possible. The low silicon utilization rate is considered to be due to the reaction between silicon and carbon in the Si—C composite material, resulting in production of silicon carbide, if the heat treatment temperature during carbon coating is high. If the temperature during film formation by the CVD method is lowered, the reduction in silicon utilization rate can be suppressed, but there is concern that carbonization is not sufficient and the coating layer is too thick, resulting in higher electrical resistance.

If carbon coating is not performed, the reduction in silicon utilization rate can be avoided, but the aforementioned oxidation cannot be suppressed. Si—C composite materials can be used as the negative electrode active material of lithium-ion secondary batteries, and a common method for producing the negative electrode is to apply and dry an aqueous slurry containing the negative electrode active material on a current collector. When evaluating batteries in the laboratory, a small amount of aqueous slurry is prepared and applied in a relatively short time to produce electrodes, and therefore the Si—C composite material is hardly oxidized in water and has little adverse effect on battery performance. However, in actual battery production, when a large amount of aqueous slurry is prepared and applied to large-area electrodes, the Si—C composite material is oxidized in the aqueous slurry. For example, it is possible to assume a problem in which the degree of oxidation differs between the initial and final stage of the application and capacity of the electrode is reduced at the end of the application. It is also possible to assume a problem in which hydrogen is generated during oxidation in water, and this hydrogen remains in the coating layer, causing pinholes and other application defects.

In the present invention, an object thereof is to provide a composite particle that can achieve high silicon utilization rate in lithium-ion secondary batteries and at the same time suppress oxidation when the Si—C composite material is dispersed in water, that is, to provide a composite particle composed of a Si—C composite material that achieves high silicon utilization rate in lithium-ion secondary batteries and is unlikely to be oxidized when dispersed in water.

Solution to Problem

Patent Literature 1 does not discuss the quality of the carbon coating. Although Patent Literature 1 discloses an experimental example of carbon coating at 550° C., wherein a reduction in capacity of a Si—C composite material was suppressed before and after carbon coating, the weight was increased by 4.6%, which means that the film layer is thick and may increase electrical resistance when made into a lithium-ion secondary battery. In addition, there is no description on the effect of suppressing oxidation during water dispersion in Patent Literature 1. In order to form a carbon layer of good quality in terms of water and oxygen barrier properties, it is generally necessary to carry out the carbon CVD method at high temperature.

On the other hand, when carbon and silicon are exposed to high temperature while in contact with each other, it is believed that silicon carbide (SiC) is produced. Since lithium insertion and deinsertion reactions do not occur in silicon carbide, the silicon utilization rate is reduced as the proportion of silicon carbide in the Si—C composite material is increased.

The present inventors have made investigations on coating raw materials and coating methods in order to suppress production of SiC and to obtain a coating layer of good quality. As a result, they have found a new composite particle that can increase the silicon utilization rate and suppress oxidation during water dispersion by having a thin coating layer containing carbon and oxygen on the surface of a Si—C composite material, thereby completing the present invention.

That is, the present invention comprises the following configurations, for example.

[1]

A composite particle comprising a particle comprising a carbon material and silicon, and a coating layer comprising carbon and oxygen on the surface of the particle, wherein the composite particle has a true density according to dry density measurement using helium gas of 1.80 g/cm$^3$ or more and 1.99 g/cm$^3$ or less;

in the Raman spectrum of the composite particle, a peak is present at 450 to 495 cm$^{-1}$, and when the intensity of the peak is defined as $I_{Si}$ and the intensity of the G band (peak intensity in the vicinity of 1580 cm$^{-1}$) is defined as $I_G$, $I_{Si}/I_G$ is 1.3 or less; and when the ratios of the number of atoms of Si, O, and C according to the Narrow spectrum of X-ray photoelectron spectroscopy for the composite particle are defined as $A_{Si}$, $A_O$, and $A_C$, respectively, and when, among the Si species ratios according to Si2p spectral state analysis, the ratios of $SiO_2$ and SiO are defined as $B_{SiO2}$ and $B_{SiO}$, respectively, $A_{Si}$ is 0.05 or more, and at least one of the following expressions (1) and (2) is satisfied:

$$Y \geq 0.75 \tag{1}$$

$$Y \geq -0.32X + 0.81 \tag{2}$$

wherein in expressions (1) and (2), $X=I_{Si}/I_G$ and $Y=A_C/(A_C+A_{Si}\times(B_{SiO2}+B_{SiO}))$.

[2]

The composite particle according to [1], wherein $I_{Si}/I_G$ is 0.64 or less and the expression (1) is satisfied.

[3]

The composite particle according to [1] or [2], wherein the carbon material is porous carbon and silicon is contained in at least part of pores of the porous carbon.

[4]

The composite particle according to any of [1] to [3], wherein the thickness of the coating layer is thin to the extent that it cannot be substantially measured by cross-sectional observation with an electron microscope.

[5]

The composite particle according to any of [1] to [4], wherein, in the XRD pattern according to powder XRD using a Cu-Kα radiation, the full width at half maximum of Si (111) plane peak is 3.0° or more, (peak intensity of SiC (111) plane)/(peak intensity of Si (111) plane) is 0.01 or less, and the R value according to the Raman spectrum is 0.26 or more and less than 1.34.

[6]

The composite particle according to any of [1] to [5], wherein the composite particle is hydrophobic.

[7]

The composite particle according to any of [1] to [6], containing substantially no graphite inside the composite particle.

[8]

The composite particle according to any of [1] to [7], wherein the composite particle has a 50% particle size in the volume-based cumulative particle size distribution, $D_{V50}$, of 1.0 to 30.0 μm.

[9]

The composite particle according to any of [1] to [8], wherein the composite particle has a silicon content rate of 30% by mass or more and 80% by mass or less, and an oxygen content rate of 4.0% by mass or less.

[10]

A method for producing a composite particle, comprising:

step (A) of contacting porous carbon with a silicon-containing gas to deposit silicon in pores and on the surface of the carbon material, thereby obtaining a Si/C particle;

step (B) of contacting the Si/C particle with a gas containing a hydrocarbon having an unsaturated bond at 400° C. or lower; and step (C) of oxidizing a hydrocarbon-containing layer obtained in the step (B).

[11]

The method for producing a composite particle according to [10], wherein the step (A) and the step (B) are carried out in succession.

[12]

The method for producing a composite particle according to [10] or [11], wherein the composite particle according to any of [1] to [9] is produced.

[13]

A polymer-coated composite particle comprising an inorganic particle-containing polymer component coating layer on at least part of the surface of the composite particle according to [1] to [9], wherein the inorganic particle-containing polymer component coating layer contains an inorganic particle composed of one or more selected from graphite and carbon black, and a polymer component, and has a polymer component content rate of 0.1 to 10.0% by mass.

[14]

A negative electrode active material comprising the composite particle according to [1] to [9] or the polymer-coated composite particle according to [13].

[15]

A negative electrode mixture layer comprising the negative electrode active material according to [14].

[16]

A lithium-ion secondary battery comprising the negative electrode mixture layer according to [15].

Advantageous Effects of Invention

The present invention can provide a composite particle that has a high silicon utilization rate and is unlikely to be oxidized during water dispersion, a negative electrode active material for lithium-ion secondary batteries using the same, and a lithium-ion secondary battery.

DESCRIPTION OF EMBODIMENTS

Next, the present invention will be specifically described. Unless otherwise noted, “lithium-ion secondary battery” may be simply referred to as “battery”.

[1] Composite Particle

A composite particle according to the present invention is a composite particle including a particle including a carbon material and silicon, and a coating layer including carbon and oxygen on the surface of the particle. That is, the composite particle according to the present invention is a particulate substance that has a coating layer including carbon and oxygen on its surface and has a particulate substance including a carbon material and silicon on the inner side of the coating layer.

The “particulate substance including a carbon material and silicon” (hereinafter, also referred to as “Si/C particle”) is a particulate substance that contains silicon (Si) on the surface and inside of the carbon material. It is preferable that the carbon material be porous carbon and it is preferable that silicon be contained in at least the pores of the porous carbon. The “porous carbon” refers to carbon having pores. It is preferable that fine Si domains be uniformly formed inside the carbon material. The “Si domains” are the regions in which silicon is present. When the Si/C particle has this structure, the expansion and contraction associated with charging and discharging occur isotropically, which improves charging and discharging cycle durability. This structure can be determined by performing cross-sectional SEM-EDS observation of the composite particle. If the distributions of silicon and carbon overlap inside the composite particle, it indicates that the Si domains finer than the spatial resolution of SEM-EDS are uniformly dispersed.

The Si/C particle can be obtained by contacting particulate porous carbon with a silicon source, such as silane ($SiH_4$), to deposit silicon (usually in an amorphous form) in the pores within the porous carbon. At this time, by using porous carbon having fine pores, fine Si domains can be uniformly formed in the particle.

In the Raman spectrum of the composite particle of the present invention, peaks are present at least at Raman shift=450 to 495 $cm^{-1}$, in the vicinity of 1350 $cm^{-1}$, and in the vicinity of 1580 $cm^{-1}$. Normally, crystalline silicon, such as silicon wafers, particulate silicon, and heat-treated $SiO_x$, has a peak in the vicinity of 520 $cm^{-1}$. Since amorphous silicon has a peak at a lower Raman shift, the presence of a peak at 450 to 495 $cm^{-1}$ indicates that the composite particle has amorphous silicon. When silicon is amorphous, expansion and contraction are relatively isotropic during charging and discharging, which can improve the cycle characteristics.

When the intensity of this peak at 450 to 495 $cm^{-1}$ is defined as $I_{si}$ and the intensity of the G band (peak intensity in the vicinity of 1580 $cm^{-1}$) is defined as $I_G$, the ratio $I_{si}/I_G$ is 1.3 or less, preferably 0.94 or less, still more preferably 0.64 or less, and most preferably 0.54 or less.

The appearance of the silicon peak in the Raman spectrum indicates that silicon is present, for example, on the surface of the composite particle and/or in the pores around the surface of the Si/C particle. While XPS, which will be described later, provides information from the surface of a substance to a depth of a few nanometers, the Raman spectrum is known to provide information from the surface to a depth of about 1 μm to sub-micrometer in carbon materials (hereinafter, the position of information obtained by the Raman spectrum is also referred to as “around the surface”).

An $I_{Si}/I_G$ of 1.3 or less for the composite particle indicates that the Si/C particle surface is not covered thickly with a silicon-containing component and has a configuration that includes silicon and carbon. On the other hand, if the proportion of silicon is very high, $I_{Si}/I_G$ will be a value much larger than the above range. With an $I_{Si}/I_G$ within the above range, the Si/C particle surface expands and contracts to the same degree as the Si/C particle interior does during charging and discharging, and the stresses of expansion and contraction are prevented from being concentrated on the Si/C particle surface, leading to improvement in the cycle characteristics.

The lower limit of $I_{Si}/I_G$ is preferably 0.01. It is more preferably 0.02. When it is less than 0.01, the thickness of the coating layer is increased, which causes an increase in electrical resistance.

Note that the “peak intensity” is the height from the baseline to the peak apex after the baseline is corrected.

The value of $I_{Si}/I_G$ can be changed by, for example, adjusting the reaction conditions (gas composition ratio, gas flow rate, temperature program, and reaction time) in the step (A) in a method for producing a composite particle, which will be described later.

For the composite particle according to one embodiment of the present invention, in the XRD pattern according to powder X-ray diffraction measurement (powder XRD) using a Cu-Kα radiation, it is preferable that the full width at half maximum of Si (111) plane peak be 3.0° or more. The full width at half maximum of 3.0° or more means that the crystallite size of silicon in the composite particle is small, which leads to suppression of silicon breakdown associated with charging and discharging. From the same viewpoint, the full width at half maximum is preferably 4.0° or more, and more preferably 5.0° or more. Moreover, it is preferable that the full width at half maximum be 10.0° or less, and it is more preferable that the full width at half maximum be 8.0° or less. Note that the Si (111) plane peak means a peak appearing in the vicinity of 28° at 2θ derived from Si. Also, the “peak intensity” upon determining the full width at half maximum is the height from the baseline to the peak apex after the baseline is corrected.

It is preferable that the composite particle according to one embodiment of the present invention have an R value ($I_D/I_G$) of 0.26 or more and less than 1.34, wherein the R value is a ratio of the intensity of the D band (peak intensity in the vicinity of 1350 $cm^{-1}$), $I_D$, to the intensity of the G band, $I_G$, according to the Raman spectrum. When the R value is 0.26 or more, the negative electrode using this composite particle has sufficiently low reaction resistance, which thus leads to improvement in the coulombic efficiency of the battery. On the other hand, an R value of less than 1.34 means that there are few defects in the carbon material. When the R value is less than 1.34, the internal resistance of the battery is lowered and the rate characteristics are improved. From the same viewpoint, the R value is more preferably 0.45 or more, and still more preferably 0.65 or more. Furthermore, the R value is more preferably 1.30 or less, and still more preferably 1.20 or less.

The composite particle according to the present invention has a coating layer including carbon and oxygen on its surface. The structure of this composite particle has the characteristics below.

When the ratios of the number of atoms of Si, O, and C according to the Narrow spectrum of X-ray photoelectron spectroscopy (XPS) for the composite particle are defined as $A_{Si}$, $A_O$, and $A_C$, respectively, and when, among the Si species ratios according to Si2p spectral state analysis, the ratios of $SiO_2$ and SiO are defined as $B_{SiO2}$ and $B_{SiO}$, respectively, $A_{Si}$ is 0.05 or more, and at least one of the following expressions (1) and (2) is satisfied.

$$Y \geq 0.75 \quad (1)$$

$$Y \geq -0.32X + 0.81 \quad (2)$$

wherein in expressions (1) and (2), $X=I_{Si}/I_G$ and $Y=A_C/(A_C+A_{Si}\times(B_{SiO2}+B_{SiO}))$.

Note that $A_{Si}+A_O+A_C=1.00$.

XPS is a technique to obtain knowledge about the types, amounts to be present, and chemical bonding states of elements present on the surface of a substance, and is known to provide information from the surface of the substance to a depth of a few nanometers.

<1> $A_{Si}$

When $A_{Si}$ is less than 0.05, it means that the coating layer is too thick. When the coating layer is too thick, the electrical resistance of the composite particle will be increased. $A_{Si}$ is preferably 0.15 or more, and still more preferably 0.25 or more. Since the analysis depth of XPS is very shallow, a few nanometers, the fact that Si can be observed to some extent means that the coating layer is an extremely thin layer.

Since the coating layer contains carbon and oxygen, it has lower electron conductivity than carbon coating. The coating layer needs to be a thin layer because if it is too thick, the electrical resistance will be increased.

<2> $A_C/(A_C+A_{Si}\times(B_{SiO2}+B_{SiO}))$

The value of $A_C/(A_C+A_{Si}\times(B_{SiO2}+B_{SiO}))$ is an index of the concentration of carbon in the composite particle, from the surface to a depth of a few nanometers (depth of spatial resolution of XPS). This is because Si is thought to be present as oxides such as $SiO_2$ and SiO on the surface of the composite particle and most of the composite particle surface is thought to be formed of carbon and silicon oxides such as $SiO_2$ and SiO. However, since $A_C$ includes information not only about the surface but also about carbon in the Si/C particle, this index does not reflect the carbon concentration only for the coating layer.

A small value of $A_C/(A_C+A_{Si}\times(B_{SiO2}+B_{SiO}))$ indicates that the carbon concentration on the composite particle surface is low. When this carbon concentration is low, the oxidation suppression ability is reduced. That is, the composite particle is easily oxidized.

However, as the silicon concentration around the composite particle surface is increased, the oxidation suppression ability is sufficiently demonstrated even if the carbon concentration on the composite particle surface is reduced. This is thought to be probably because, as the silicon concentration around the composite particle surface is increased, that is, as $I_{Si}/I_G$ is increased, silicon that could be oxidized is less likely to be oxidized due to the presence of a complex between carbon derived from a hydrocarbon and a silicon oxide. In other words, the index of carbon concentration represented by $A_C/(A_C+A_{Si}\times(B_{SiO2}+B_{SiO}))$ is affected by the silicon concentration around the composite particle surface.

Therefore, the composite particle according to the present invention satisfy the following expression (1).

$$Y \geq 0.75 \quad (1)$$

where, in expression (1), $Y=A_C/(A_C+A_{Si}\times(B_{SiO2}+B_{SiO}))$.

However, when the silicon concentration around the composite particle surface is relatively high (specifically, when $I_{Si}/I_G$ is greater than 0.2), the following expression (2) only needs to be satisfied and the above expression (1) does not necessarily have to be satisfied.

$$Y \geq -0.32X + 0.81 \quad (2)$$

where, in expression (2), $X=I_{Si}/I_G$ and $Y=A_C/(A_C+A_{Si}\times(B_{SiO2}+B_{SiO}))$.

When the above expressions (1) and (2) are both not satisfied, the oxidation suppression ability of the composite particle is low.

Y, that is $A_C/(A_C+A_{Si}\times(B_{SiO2}+B_{SiO}))$, is preferably 0.85 or more.

Y, that is $A_C/(A_C+A_{Si}\times(B_{SiO2}+B_{SiO}))$, is preferably 0.98 or less.

The structure of the coating layer cannot be specified, but it is preferably a thin film layer in which the surface carbon and silicon oxide are composited.

The value of $A_C/(A_C+A_{Si}\times(B_{SiO2}+B_{SiO}))$ can be changed by, for example, adjusting the reaction temperature, reaction time, reaction pressure, or the type or concentration of hydrocarbon in the step (B) in a method for producing a composite particle, which will be described later.

It is preferable that the coating layer contain a hydrocarbon-derived compound. Whether this coating layer contains a hydrocarbon-derived compound can be determined by carrying out pyrolysis GC-MC measurement for the composite particle and observing if the gas generated from the composite particle between 200° C. and 600° C. contains the hydrocarbon-derived compound.

The coating layer can be produced by contacting the Si/C particle with a carbon source having an unsaturated bond at low temperature and subsequently oxidizing the obtained substance. Details will be described later.

In the composite particle according to one embodiment of the present invention, it is preferable that the coating layer be thin to the extent that it cannot be substantially measured by cross-sectional observation with an electron microscope. When the coating layer is thin as described above, the composite particle has low electrical resistance. Scanning electron microscopes (SEM) do not have enough resolution to determine a thickness of a few nanometers, and therefore, cannot measure the thickness of coating layers that are thinner than that. Although transmission electron microscopes (TEM) have sufficient resolution and can observe even a thickness of a few nanometers, when preparing a thin film sample for TEM observation that contains the coating layer from the composite particle, the coating layer of the composite particle is damaged and destroyed by the processing. Therefore, in reality, the thickness of the coating layer cannot be observed by TEM. The thickness "cannot be substantially measured" refers to such a state. However, even for thin films that cannot be substantially measured by cross-sectional observation with an electron microscope, the presence of the coating layer can be confirmed by XPS as described above or by a test for surface hydrophobicity, which will be described later.

The composite particle according to the present invention has a true density of 1.80 g/cm$^3$ or more. This value is calculated by dry density test using helium gas.

A true density of less than 1.80 g/cm$^3$ means that the amount of silicon filled into the pores of carbon in the composite particle is small, or that the coating layer is a thick layer of a low-density organic material such as a tar component or polymer.

A true density of 1.80 g/cm$^3$ or more indicates that the amount of silicon filled into the pores of carbon in the composite particle is sufficient and that the coating layer is thin, which can increase the specific capacity of the composite particle and lower its electrical resistance. From the same viewpoint, the true density is preferably 1.85 g/cm$^3$ or more, and more preferably 1.88 g/cm$^3$ or more.

The composite particle according to the present invention has a true density of 1.99 g/cm$^3$ or less. When the true density is 1.99 g/cm3 or less, the carbon material in the composite particle is amorphous and the construction of the carbon material is more isotropic. Since the true density is lower than the literature data for the densities of carbon and silicon, it is thought that there are vacancies in the composite particle where helium gas cannot penetrate from outside the particle, and therefore, the cycle characteristics can be enhanced when the true density is in the above range. In addition, the amount of silicon carbide in the composite particle is small, which can suppress the reduction in silicon utilization rate. Since silicon carbide has a higher density compared to carbon and Si, the true density is higher when silicon carbide is contained in the composite particle. From this viewpoint, the true density is preferably 1.98 g/cm$^3$ or less, and more preferably 1.96 g/cm$^3$ or less.

The true density according to dry density test can be measured by the gas phase substitution method. The gas phase substitution method is a method in which the sample and helium gas are placed in a container whose volume has been measured beforehand with helium gas in an environment maintained at a constant temperature, and the true density is calculated on the basis of the volume of helium gas pushed away by the sample and the mass of the sample. As an apparatus for the gas phase substitution method, AccuPyc® II 1340 Gas Pycnometer manufactured by Micromeritics Instrument Corporation can be used, for example.

For the composite particle according to one embodiment of the present invention, in the XRD pattern according to powder X-ray diffraction measurement (powder XRD) using a Cu-Kα radiation, it is preferable that the (peak intensity of SiC (111) plane)/(peak intensity of Si (111) plane) be 0.01 or less. As a result, SiC (silicon carbide) is not contained in the composite particle or the content of SiC is extremely low, and therefore, the utilization rate of silicon as a battery active material is improved and the initial discharge capacity can be increased. Note that the (peak intensity of SiC (111) plane)/(peak intensity of Si (111) plane) is also denoted as $I_{SiC(111)}/I_{Si(111)}$. It is more preferable that the lower limit of $I_{SiC(111)}/I_{Si(111)}$ be 0.00, that is, the peak intensity of SiC (111) plane be not observed. Note that the SiC (111) plane peak is a peak appearing in the vicinity of 35° at 2θ derived from SiC. Also, the Si (111) plane peak is a peak appearing in the vicinity of 28° at 2θ derived from Si.

It is preferable that the composite particle according to one embodiment of the present invention be hydrophobic. When it is hydrophobic, the protective effect against water is improved. In addition, the negative electrode mixture layer contains a polymer that serves as a binder. The polymer has good familiarity with hydrophobic particles, and therefore, more uniform dispersion can be achieved when preparing the slurry for negative electrode application.

A hydrophobic composite particle can be produced by, for example, using a hydrocarbon having an unsaturated bond in step (B), which will be described later.

Examples of the method for measuring hydrophobicity include a method for measuring the contact angle of water to the composite particle, such as measuring the contact angle of water after forming the composite particle into the form of a pellet, and a method in which the amount of water vapor adsorbed on the composite particle is measured and divided by the nitrogen adsorption amount of the same composite particle or the BET specific surface area obtained by the nitrogen adsorption method.

As the method for measuring hydrophobicity, a method in which the osmosis behavior of powder into water is observed is simple and easy to determine hydrophobicity. This measurement can be carried out by, for example, the method described in Examples.

It is preferable that the composite particle according to one embodiment of the present invention contain no graphite inside the composite particle. The presence of graphite inside the composite particle is determined by the XRD pattern according to powder X-ray diffraction measurement (powder XRD) using a Cu-Kα radiation. When graphite is significantly present in the composite particle, a sharp peak in the vicinity of 26° at 2θ, derived from graphite, can be observed. Although halos derived from carbon or silicon oxide are simultaneously observed in this vicinity, the intensities of these patterns are low, while graphite is observed as a very sharp peak with high intensity. Therefore, when no graphite peak is observed, it is considered that graphite is not substantially contained in the composite particle.

It is difficult to obtain porous graphite, and it is also difficult to achieve uniform pore distribution in a graphite particle. It is preferable that the composite particle of the present invention have uniform formation of fine Si domains in the particle. When graphite is contained inside the composite particle, expansion and contraction during charging and discharging occur non-uniformly in the particle, resulting in a reduction in the cycle characteristics.

As described above, it is preferable that the expansion and contraction during charging and discharging occur uniformly in the particle, and therefore, it is preferable that the shape of the composite particle according to one embodiment of the present invention have an average aspect ratio of 1.25 or less, and it is more preferable that part of the particle has no corner. It is still more preferable that the composite particle is spherical (the cross-section of the composite particle is circular). The aspect ratio is a numerical value obtained by dividing the long diameter of a particle by the short diameter. Since an aspect ratio of 1.00 indicates that the long diameter and the short diameter are equal, the closer the average aspect ratio is to 1.00, the more preferable it is.

The degree of sphericity can be determined by the average circularity calculated from the cross-sectional shape. The average circularity is preferably 0.95 or more and 1.00 or less. The circularity is represented by the following expression:

$$(\text{circularity}) = 4\pi \times (S/L^2)$$

wherein S is the particle cross-sectional area [$m^2$] and L is the particle perimeter [m].

The above average aspect ratio and average circularity can be calculated by analyzing images from a scanning electron microscope (SEM) using image analysis software. The analysis is carried out on 100 composite particles randomly selected in SEM photographs, and the average value of the 100 (average of the number of particles) is used to determine them. Examples of the image analysis software include ImageJ.

In the composite particle according to one embodiment of the present invention, it is preferable that the BET specific surface area be 0.1 $m^2/g$ or more. When the BET specific surface area is 0.1 $m^2/g$ or more, the slurry viscosity at the time of electrode production can be made suitable, whereby a good electrode can be produced. From the same viewpoint, the BET specific surface area is more preferably 0.5 $m^2/g$ or more, and still more preferably 0.9 $m^2/g$ or more.

In the composite particle according to one embodiment of the present invention, it is preferable that the BET specific surface area be 100.0 $m^2/g$ or less. When the BET specific surface area is 100.0 $m^2/g$ or less, side reactions with the electrolytic solution can be reduced. From the same viewpoint, the BET specific surface area is more preferably 50.0 $m^2/g$ or less, and still more preferably 25.0 $m^2/g$ or less.

The BET specific surface area is usually calculated using the BET method from the adsorption isotherm, which is measured by a dedicated measuring apparatus known in the art. As the adsorption gas, nitrogen is usually used.

It is preferable that the composite particle according to one embodiment of the present invention have a 50% particle size in the volume-based cumulative particle size distribution, $D_{V50}$, of 1.0 μm or more. This is because, when the $D_{V50}$ is 1.0 μm or more, side reactions with the electrolytic solution can be reduced. Furthermore, the powder is excellent in handleability, a slurry having a viscosity and a density suitable for application is easily prepared, and the density of the electrode is easily increased. From this viewpoint, $D_{V50}$ is more preferably 2.0 μm or more, still more preferably 3.0 μm or more, and most preferably 3.5 μm or more.

It is preferable that the composite particle according to one embodiment of the present invention have a $D_{V50}$ of 30.0 μm or less. When $D_{V50}$ is 30.0 μm or less, the diffusion length of lithium in each particle is short, and thus the rate characteristics of a lithium-ion battery are excellent, and in addition, stripping or abnormal unevenness does not occur when the slurry is applied to a current collector. From this viewpoint, $D_{V50}$ is more preferably 20.0 μm or less, and still more preferably 15.0 μm or less.

It is preferable that the composite particle according to one embodiment of the present invention have a 90% particle size in the volume-based cumulative particle size distribution, $D_{V90}$, of 50.0 μm or less. When $D_{V90}$ is 50.0 μm or less, the diffusion length of lithium in each particle is short, and thus the rate characteristics of a lithium-ion battery are excellent, and in addition, stripping or abnormal unevenness does not occur when the slurry is applied to a current collector. From this viewpoint, $D_{V90}$ is more preferably 40.0 μm or less, still more preferably 30.0 μm or less, and most preferably 20.0 μm or less.

These volume-based cumulative particle size distributions are measured by, for example, a laser diffraction particle size analyzer.

It is preferable that the composite particle according to one embodiment of the present invention have a silicon content rate of 30% by mass or more. Here, the "silicon content rate" of the composite particle is the content rate of silicon alone and its compounds contained in the composite particle as the silicon element. When the silicon content rate is 30% by mass or more, the amount of silicon in the composite particle is sufficient, and the discharge capacity can be increased. From the same viewpoint, the silicon content rate is more preferably 35% by mass or more, and still more preferably 40% by mass or more.

It is preferable that the composite particle according to one embodiment of the present invention have a silicon content rate of 80% by mass or less. When the silicon content rate is 80% by mass or less, the amount of silicon in the composite particle is not excessive, and therefore, the volume change due to its expansion and contraction can be absorbed by carbon. From the same viewpoint, the silicon content rate is more preferably 75% by mass or less, and still more preferably 70% by mass or less.

The silicon content rate in the composite particle can be obtained by carrying out X-ray fluorescence analysis measurement and analyzing the results using the Fundamental Parameter (FP) method or other methods. The silicon content rate can also be quantified by burning the composite particle to remove the carbon contents, completely dissolving the ash residue in acid or alkali, and then using inductively coupled plasma atomic emission spectroscopy (ICP-AES).

It is preferable that the composite particle according to one embodiment of the present invention have an oxygen content rate of 4.0% by mass or less. An oxygen content rate of 4.0% by mass or less can reduce the irreversible capacity of the negative electrode of a lithium-ion secondary battery. From the same viewpoint, the oxygen content rate is more preferably 2.0% by mass or less, and still more preferably 1.0% by mass or less. The lower limit of the oxygen content rate is preferably 0.2% by mass. When the oxygen content rate is 0.2% by mass or more, high oxidation suppression ability is expressed.

The oxygen content rate in the composite particle can be measured by, for example, an oxygen-nitrogen analyzer.

In the present invention, the oxygen content rate of the composite particle refers to the oxygen content rate of those within 2 days after production or those stored in a non-oxidizing atmosphere, unless otherwise noted. If the measurement cannot be performed within 2 days after production due to process reasons, for example, the composite particle may be stored in an inert atmosphere such as argon and measured at a later date, and the value may be considered equivalent to the value within 2 days after production. This is because oxidation does not proceed when the composite particle is stored in an inert atmosphere.

[2] Method for Producing Composite Particle

A method for producing a composite particle according to the present invention includes the following step (A), step (B), and step (C). By the method for producing a composite particle of the present invention, the aforementioned composite particle of the present invention, that is, the composite particle described in the above [1], can be obtained.

- step (A): a step of contacting porous carbon with a silicon-containing gas (that is, allowing them to react with each other) to deposit silicon in the pores and on the surface of the porous carbon, thereby obtaining a Si/C particle;
- step (B): a step of contacting the Si/C particle with a gas containing a hydrocarbon having an unsaturated bond at 400° C. or lower; and
- step (C): a step of oxidizing a substance obtained in the step (B).

A carbon material having pores is referred to herein as "porous carbon". Since it is preferable that the composite particle have a structure in which silicon is contained in the particle, it is preferable that the porous carbon have a pore volume that can carry silicon inside. In addition, in a nitrogen adsorption test of the carbon material (porous carbon), when the pore volume at a relative pressure $P/P_0$ of 0.99 is defined as $V_{0.99}$, it is more preferable that $V_{0.99}$ be 0.25 cc/g or more and 1.50 cc/g or less.

Moreover, since it is preferable that silicon be contained in the composite particle as fine domains, it is still more preferable that there be many fine pores in the porous carbon. Specifically, in a nitrogen adsorption test of the porous carbon, when the pore volume at a relative pressure $P/P_0$ of 0.01 is defined as $V_{0.01}$, $V_{0.01}/V_{0.99}$ is still more preferably 0.45 or more, and most preferably 0.55 or more. As the nitrogen adsorption test, known methods can be used.

As the porous carbon, activated carbon, activated carbon fibers, molecular sieving carbon, or inorganic template carbon can be used, for example. Porous carbon obtained by activating hard carbon with steam or carbon dioxide can also be used. It is preferable to select and use porous carbon that meets the conditions described above. Activated carbon fibers may be in the form of pulverized particles, or they may be pulverized and made into particles after silicon is carried.

Hard carbon can be obtained by, for example, heat-treating a phenolic resin in an inert atmosphere at 600° C. to 1400° C., preferably 800° C. to 1400° C.

It is preferable to perform the step (A) after adjusting the porous carbon to the desired composite particle shape or particle size distribution. This is because the shape and particle size distribution of the composite particle are not different from the shape and particle size distribution of the porous carbon, since the shape and particle size of particles are hardly changed in the step (A), the step (B), and the step (C). Therefore, the porous carbon to be used in the step (A) may be crushed or pulverized, and sieving may be performed.

After the composite particle is produced through the step (A), the step (B), and the step (C), there are cases where the particles are aggregated with each other. In such cases, it is preferable to perform crushing to return them to the shape and particle size distribution of the raw material porous carbon. However, it is not preferable at that time to add excessive energy and crush the composite particle to change its particle shape, as this will increase the areas on the composite particle surface with no coating layer and lower the oxidation suppression ability.

It is preferable that the porous carbon be spherical. The spherical porous carbon is more preferably one obtained by carbonizing a spherical phenolic resin and then activating it. In addition, the spherical porous carbon is still more preferably one that has not undergone a pulverization step, as it can retain its spherical shape.

As the silicon-containing gas, preferably, silane gas can be used. Silane gas may be mixed for use with an inert gas such as helium or argon, or with a reducing gas such as hydrogen.

The step (A) is a step of placing porous carbon in a reactor, and contacting the porous carbon with a silicon-containing gas to deposit silicon in the pores and on the surface of the porous carbon, thereby obtaining a Si/C particle.

The form of the reactor is not limited. As the reactor, static furnaces, furnaces that have a powder stirring function such as fluidized bed furnaces and rotary kilns, and continuous furnaces such as roller hearth kilns and pusher furnaces can be used.

There is no limitation on the reaction temperature as long as it is a temperature at which the silicon-containing gas such as silane gas is decomposed and silicon is deposited in the pores of the porous carbon, but it is preferably 300° C. or higher and 450° C. or lower. Below 300° C., silane gas decomposition does not occur sufficiently, resulting in insufficient silicon deposition. Above 450° C., rather than silane gas decomposition occurring in the pores of the porous carbon and silicon deposition in the pores, silicon deposition on the surface of the porous carbon (including the openings of the pores as well) becomes more pronounced, and the openings of the pores are blocked by the deposited silicon, resulting in insufficient deposition in the pores.

Even at 450° C. or lower, silane decomposition occurs on the surface of the porous carbon and silicon is deposited. In general, the surface area of the pores of the porous carbon is much larger than the external surface area, and therefore, the amount of silicon deposited in the pores of the porous carbon is overwhelmingly large. It is preferable that silicon be present in the pores of the porous carbon rather than on the external surface because the durability against the stress in the composite particle caused by the expansion and contraction of silicon in association with charging and discharging of the battery is enhanced. With treatment at higher temperatures, deposition on the surface of the porous carbon becomes more pronounced, and the number of sites where the openings of the pores are blocked is increased.

Conditions such as gas composition ratio, gas flow rate, and temperature program are adjusted as appropriate while observing the nature of the composite particle.

The step (B) is a step of placing the Si/C particle obtained in the step (A) in a reactor and contacting the Si/C particle with a gas containing a hydrocarbon having an unsaturated bond at 400° C. or lower. The coating layer of the composite particle according to the present invention is thin. Methods that deposit carbon on the surface, such as carbon CVD, are not suited because thick carbon coatings are formed. It is preferable to allow a Si—H group on the surface of the Si/C particle to react with a hydrocarbon having an unsaturated bond to form a hydrocarbon-containing layer on the surface of the Si—C particle. This hydrocarbon-containing layer may contain a substance in which the hydrocarbons have reacted with each other. As the gas of hydrocarbon having an unsaturated bond, gases of hydrocarbon having a double bond or triple bond can be used. If the hydrocarbon is a compound that has a low vapor pressure and is not gasified at normal pressure, the hydrocarbon may be used at a pressure lower than normal pressure. Preferred examples thereof include acetylene, ethylene, propylene, and 1,3-butadiene, which are gases at normal pressure, and acetylene and ethylene are more preferable. At this time, multiple types of hydrocarbons may be used. Also, an inert gas such as helium or argon, or a reducing gas such as hydrogen may be mixed for use.

In the step (B), treatment at a low temperature of 400° C. or lower is necessary to allow a Si—H group to react with an unsaturated bond. Above this temperature, the amount of Si—H groups that are decomposed is increased and the targeted reaction, that is, the reaction between a Si—H group on the surface of the Si—C particle and an unsaturated bond of the hydrocarbon, is less likely to occur. In addition, since the reactivity of silicon in the Si/C particle is very high, temperatures higher than 400° C. cause a reaction between the porous carbon and silicon, resulting in production of silicon carbide, which reduces the capacity of silicon.

The lower limit of the reaction temperature is not limited as long as it is a temperature at which the hydrocarbon having an unsaturated bond reacts on the Si/C particle surface. However, a lower reaction temperature results in a lower reaction rate. Therefore, the lower limit of the reaction temperature is preferably 100° C. or higher, and more preferably 150° C. or higher.

The thickness of the hydrocarbon-containing layer may be equivalent to a molecular layer of the hydrocarbon, or it may be equivalent to a few molecular layers. Also, part of the hydrocarbon may be decomposed. Even when part of the hydrocarbon is decomposed and becomes carbon, it is preferable that the hydrocarbon-containing layer be a thin film because, unlike the carbon coating, it is of a material with high electrical resistance. Accordingly, a smaller change in weight before and after the step (B) is preferable. The increase in the mass of the Si/C particle with the hydrocarbon-containing layer obtained in the step (B) relative to the mass of the Si/C particle before the step (B) is more preferably 1.0% by mass or less, and still more preferably 0.5% by mass or less.

The step (C) is a step of oxidizing a substance obtained in the step (B). This step (C) is a step of introducing oxygen into the coating layer (or more precisely, the hydrocarbon-containing layer formed on the Si/C particle surface in the step (B)). Although the structure of the coating layer is not clear, oxygen contained in the coating layer improves the oxidation suppression ability and lowers the electrical resistance. Oxidation can be carried out by contacting an oxygen-containing gas (more specifically, an oxidizing gas) with the coating layer. The oxygen-containing gas has an oxygen concentration of preferably 1 to 25% by volume, more preferably 1 to 20% by volume, and still more preferably 5 to 20% by volume. In such cases, oxygen is diluted with argon or nitrogen. Air may be used as the oxygen-containing gas, but for carrying out stable oxidation, it is preferable to adjust the humidity of the air and keep it constant.

The reaction temperature, that is, the temperature at which the coating layer is brought into contact with the oxygen-containing gas, is preferably room temperature or higher and 200° C. or lower. Temperatures above 200° C. are not preferable because decomposition of the coating layer or oxidation of silicon beyond necessity will occur.

The reaction time, that is, the duration during which the coating layer is in contact with the oxygen-containing gas, is 0.1 to 120 hours, for example.

In the step (C), the oxidation treatment may be performed while changing the oxygen concentration.

It is preferable to heat-treat the coating layer under an inert atmosphere or at low pressure after contacting the oxygen-containing gas. The temperature during heat treatment is preferably 400° C. or lower. It is thought that, with heat treatment at 400° C. or lower, unreacted Si—H groups are decomposed and converted to silicon, whereby oxygen is stably composited into the coating layer. The heat treatment time is, for example, 0.1 to 100 hours.

It is preferable to carry out the step (A) and the step (B) in succession. Since silicon on the surface of the Si/C particle obtained in the step (A), is highly active, oxidation proceeds when exposed to the atmosphere, resulting in a reduction of Si—H groups on the surface. Accordingly, it is preferable to carry out the steps (A) and (B) in succession without exposure to the atmosphere (air). The time between the step (A) and the step (B) is not limited as long as the Si/C particle is not exposed to the atmosphere. For example, after the step (A), the Si/C particle may be stored under an inert atmosphere and then the step (B) may be carried out. Also, as long as the Si/C particle obtained in the step (A) is not brought into contact with the atmosphere, the step (A) and the step (B) may be performed using different apparatuses.

The step (B) and the step (C) may be performed using different apparatuses. Also, the step (B) and the step (C) may be performed multiple times. Examples thereof include a method in which the step (C) is performed and then the step (B) is performed, or in which the step (C) is performed, then the step (B) is performed, and subsequently the step (C) is performed.

[3] Composite Particle Further Having Surface Coating Layer

The composite particle according to the present invention may have a layer further outside of the above-described composite particle having the Si/C particle and the coating layer on the Si/C particle surface (hereinafter, also referred to as "composite particle body"). In order to distinguish it from the "coating layer" mentioned above, the layer placed further outside of the composite particle body will be referred to herein as "surface coating layer".

Examples of the method for forming the surface coating layer include a method in which a layer is formed on at least part of the surface of the composite particle, specifically by means of carbon coating, inorganic oxide coating, or polymer coating. Examples of the carbon coating technique include chemical vapor deposition (CVD) and physical vapor deposition (PVD). Examples of the inorganic oxide coating technique include chemical vapor deposition (CVD), physical vapor deposition (PVD), atomic layer deposition (ALD), and wet method. The wet method includes a method of coating the composite particle body with a liquid obtained by dissolving and/or dispersing a precursor of an inorganic oxide in a solvent, and removing the solvent by, for example, heat treatment. As the type of polymer coating, a method of coating using a polymer solution, a method of coating using a polymer precursor containing a monomer and polymerizing by applying, for example, temperature or light, or a combination thereof may be used.

The surface coating layer of the composite particle can be analyzed by performing surface analysis of the composite particle. Examples of the surface analysis include SEM-EDS, Auger electron spectroscopy, XPS, micro-infrared spectroscopy, and micro-Raman spectroscopy.

When forming the surface coating layer, in order to avoid silicon contained in the composite particle reacting with carbon to produce silicon carbide, it is preferable to, in the case of raising the temperature during coating, limit the temperature to less than 500° C., or to use methods such as PVD or ALD, where the duration during which energy is applied to the composite particle body is only an instant and the temperature of the composite particle body is not raised for a long period of time.

As the composite particle further having a surface coating layer, the following polymer-coated composite particle is preferable. That is, the polymer-coated composite particle has, as the surface coating layer, an inorganic particle-containing polymer component coating layer on at least part of the surface of the composite particle body, wherein the inorganic particle-containing polymer component coating layer contains an inorganic particle composed of one or more selected from graphite and carbon black, and a polymer component, and has a polymer component content rate of 0.1 to 10.0% by mass.

It is preferable that production of the polymer-coated composite particle be carried out by the wet method. Specifically, this method involves mixing an inorganic particle composed of one or more selected from graphite and carbon black, a polymer component, and the composite particle body in a solvent, and then drying to remove the solvent.

At this time, a liquid in which each component has been dissolved or dispersed may be prepared in advance and then mixing may be carried out. Since it is preferable that the inorganic particle be smaller than the composite particle body, it is preferable to use a liquid in which the inorganic particle has been dispersed in advance. When preparing the liquid in which the inorganic particle has been dispersed, it is more preferable to apply shearing force using, for example, a ball mill or a bead mill, because fine particles can be uniformly dispersed. When dispersing the inorganic particle, a dispersion aid may be added as appropriate. The dispersion aid may be freely selected from known substances and used.

The type of polymer component is not particularly limited. Examples thereof include at least one selected from the group consisting of polysaccharides, cellulose derivatives, animal water-soluble polymers, lignin derivatives and water-soluble synthetic polymers, monosaccharides, disaccharides, oligosaccharides, amino acids, gallic acid, tannin, saccharin, saccharin salts and butynediol, sugar alcohols such as sorbitol, and polyhydric alcohols such as glycerin, 1,3-butanediol, and dipropylene glycol.

There is no particular limitation on the solvent as long as it can dissolve or disperse the above materials, but water is preferable. Multiple types of solvents may be mixed. The temperature during mixing is preferably 50° C. to 200° C.

The temperature during drying is not particularly limited as long as the polymer component is not decomposed and distilled off, and it can be selected from, for example, 50° C. to 200° C. Drying in an inert atmosphere or drying under vacuum may be performed.

The obtained polymer-coated composite particle may be subjected to a crushing step or a sieving step to remove coarse aggregated particles, if necessary.

The polymer component content rate can be confirmed by, for example, heating the polymer-coated composite particle that has been sufficiently dried to a temperature (for example, 300° C.) equal to or higher than the temperature at which the polymer component is decomposed and lower than the temperature at which silicon and carbon are oxidized, and measuring the mass of the composite material after the polymer component is decomposed. Specifically, when the mass of the polymer-coated composite particle before heating is defined as A g and the mass of the composite particle after heating is defined as B g, (A−B) is the content of the polymer component. The content rate can be calculated as $\{(A-B)/A\}\times 100$.

The above measurement can be performed by using thermogravimetry (TG). It is preferable because the amount of sample used is small and measurement can be performed with high accuracy.

The composite particle according to the present invention is not easily oxidized during the coating treatment in water, that is, during the formation of the surface coating layer by the wet method using water. The surface of the composite particle body can be uniformly coated.

Examples of the effect of the surface coating layer include (i) suppression of oxidation over time of silicon inside the composite particle, (ii) improvement in the initial coulombic efficiency, and (iii) improvement in the cycle characteristics.

(i) The suppression of oxidation over time of silicon inside the composite particle means that, when the composite particle is exposed to the air or an oxygen-containing gas atmosphere, oxidation over time of silicon is suppressed. The presence of the surface coating layer on the composite particle surface can further suppress the air or an oxygen-containing gas from entering the inside of the composite particle.

(ii) The improvement in the initial coulombic efficiency means that the amount of lithium ions trapped in the composite particle is reduced at the time of initial lithium ion insertion into the composite particle inside the lithium-ion battery. After lithium ions are inserted into the composite particle, if a film produced by decomposing electric solution (solid electrolyte interface <SEI> film) is formed on the composite particle surface or at lithium ion entry ports into the composite particle, the proportion of lithium ions that cannot be deinserted from the closed pores in the composite particle is increased, and thus the initial coulombic efficiency is reduced. Since the SEI film is present at the time of the second and subsequent lithium ion insertions, the ratio of lithium ions trapped in the composite particle is greatly reduced. As described above, since the problem is the trapping of lithium ions at the time of initial lithium ion insertion, the presence of the surface coating layer on the composite particle surface can prevent the insertion of lithium ions into pores that are easily blocked by the SEI coating, thereby improving the initial coulombic efficiency.

(iii) The improvement in the cycle characteristics means that, when the composite particle is applied to a lithium-ion battery and charging and discharging are repeated, a reduction in capacity is suppressed. When charging and discharging are repeated in a lithium-ion battery, it is considered that silicon in the composite particle reacts with fluorine, which is a component element of the electrolytic solution, and is eluted as a silicon fluoride compound. When silicon is eluted, the specific capacity of the composite particle is reduced. When the surface coating layer is present on the composite particle surface, the elution of silicon is suppressed and thus the reduction in capacity of the composite particle is suppressed. Also, the surface coating layer reduces the electric resistance, improves the coulombic efficiency, and improves the cycle characteristics.

[4] Negative Electrode Active Material

A negative electrode active material according to one embodiment of the present invention includes the composite particle according to the present invention. Two or more types of the composite particles according to the present invention may be mixed for use. The negative electrode active material can further contain other components. Examples of the other components include those generally used as a negative electrode active material for lithium-ion secondary batteries. Examples thereof include graphite, hard carbon, soft carbon, lithium titanate ($Li_4Ti_5O_{12}$), alloy-based active materials such as silicon and tin, and composite materials thereof. These components are usually in the form of particles. The components other than the composite particle may be used alone or in combination of two or more types thereof. Among them, graphite particles and hard carbon are particularly preferably used.

When the negative electrode active material is formed by containing other components, the composite particle is adjusted to 1 to 50% by mass in the negative electrode active material. It is preferably adjusted to be 2 to 25% by mass. By mixing and using the above-described other components, it is possible to obtain a negative electrode active material having excellent characteristics that other carbon materials have, while maintaining the excellent characteristics of the composite particle. When multiple types of materials are used as the negative electrode active material, the materials may be mixed in advance and then used, or may be sequentially added when a slurry for forming a negative electrode mixture, which will be described later, is prepared.

As an apparatus for mixing the composite particles and other materials, a commercially available mixer or stirrer can be used. Specific examples thereof include mixers such as a mortar, a ribbon mixer, a V-type mixer, a W-type mixer, a one blade mixer, and a Nauta mixer.

[5] Negative Electrode Mixture Layer

A negative electrode mixture layer according to one embodiment of the present invention includes the negative electrode active material described in the above [4].

The negative electrode mixture layer of the present invention can be used as a negative electrode mixture layer for lithium-ion secondary batteries. The negative electrode mixture layer generally includes a negative electrode active material, a binder, and a conductive assistant as an optional component.

As the method for producing the negative electrode mixture layer, a known method as will be described below can be used, for example. A negative electrode active material, a binder, a conductive assistant as an optional component, and a solvent are used to prepare a slurry for forming a negative electrode mixture. The slurry is applied to a current collector such as copper foil and dried. By further vacuum drying this, the solvent is removed. The obtained product may be referred to as negative electrode sheet. The negative electrode sheet is composed of a negative electrode mixture layer and the current collector. The negative electrode sheet is cut or punched out into a desired shape and size, and then pressed to improve the density of the electrode mixture layer (sometimes referred to as electrode density). Improving the electrode density improves the energy density of the battery. The pressing method is not particularly limited as long as the electrode can be processed to have the desired electrode density, and examples thereof include uniaxial-pressing and roll-pressing. In Examples described later, the step of carrying out the pressing after the shape processing is illustrated, but the shape processing may be performed after the pressing. In the present invention, this product having the desired shape and electrode density is referred to as a negative electrode. The negative electrode further includes, if necessary, a current collector tab attached to the current collector.

Any binder generally used in the negative electrode mixture layer of a lithium-ion secondary battery can be freely selected and used as the binder. Examples thereof include polyethylene, polypropylene, ethylene-propylene terpolymer, butadiene rubber, styrene-butadiene rubber (SBR), butyl rubber, acrylic rubber, polyvinylidene fluoride (PVdF), polytetrafluoroethylene (PTFE), polyethylene oxide, polyepichlorohydrin, polyphosphazene, polyacrylonitrile, carboxymethyl cellulose (CMC) and salts thereof, polyacrylic acid, and polyacrylamide. The binder may be used alone or in combination of two or more kinds thereof. The amount of the binder is preferably 0.5 to 30 parts by mass based on 100 parts by mass of the negative electrode material.

The conductive assistant is not particularly limited as long as it plays a role in imparting electron conductivity and dimensional stability (action of absorbing the volume change in association with insertion and deinsertion of lithium) to the electrode. Examples thereof include carbon nanotubes, carbon nanofibers, vapor grown carbon fibers (for example, "VGCF®-H" manufactured by Showa Denko K.K.), conductive carbon black (for example, "DENKA BLACK®)" manufactured by Denka Company Limited, "Super C65" manufactured by Imerys Graphite & Carbon, and "Super C45" manufactured by Imerys Graphite & Carbon), and conductive graphite (for example, "KS6L" manufactured by Imerys Graphite & Carbon and "SFG6L" manufactured by Imerys Graphite & Carbon). Multiple types of these may be used.

It is preferable to contain carbon nanotubes as the conductive assistant, carbon nanofibers, or vapor grown carbon fibers, and the fiber length of these conductive assistants is preferably ½ or more of the $D_{V50}$ of the composite particle. With this length, the conductive assistant bridges between the negative electrode active materials containing the composite particle, and the cycle characteristics can be improved. Furthermore, single-wall type or multi-wall type conductive assistants with a fiber diameter of 15 nm or less are preferable to other conductive assistants because they increase the number of bridges more with the same amount to be added. In addition, since they are more flexible, they are preferable from the viewpoint of improving the electrode density.

The amount of the conductive assistant is preferably 1 to 30 parts by mass based on 100 parts by mass of the negative electrode material.

The solvent for preparing the slurry for electrode coating is not particularly limited, and examples thereof include N-methyl-2-pyrrolidone (NMP), dimethylformamide (DMF), isopropanol, tetrahydrofuran (THE), and water. In the case of a binder using water as a solvent, a thickening agent is preferably used in combination. The amount of the solvent can be adjusted so that the slurry achieves such viscosity that the slurry is easily applied onto a current collector.

[6] Lithium-Ion Secondary Battery

A lithium-ion secondary battery according to the present invention includes the negative electrode mixture layer. The lithium-ion secondary battery usually includes a negative electrode including the negative electrode mixture layer and a current collector, a positive electrode containing a positive electrode mixture layer and a current collector, at least one of a nonaqueous electrolytic solution and a nonaqueous polymer electrolyte present therebetween, a separator, and a battery case accommodating these components. As long as the lithium-ion secondary battery includes the negative electrode mixture layer, other configurations including conventionally known configurations can be employed without particular limitation.

The positive electrode mixture layer usually includes a positive electrode material, a conductive assistant, and a binder. The positive electrode in the lithium-ion secondary battery may have a general configuration in a typical lithium-ion secondary battery.

The positive electrode active material is not particularly limited as long as electrochemical lithium insertion and deinsertion can be reversibly performed and the oxidation-reduction potential of these reactions is sufficiently higher than the standard oxidation-reduction potential of the negative electrode reaction. For example, $LiCoO_2$, $LiNiO_2$, $LiMn_2O_4$, $LiCo_{1/3}Ni_{1/3}O_2$, $LiCo_{0.6}Mn_{0.2}Ni_{0.2}O_2$, $LiCo_{0.8}Mn_{0.7}Ni_{0.1}O_2$, carbon-coated $LiFePO_4$, or a mixture thereof can be suitably used.

As the conductive assistant, the binder, and the solvent for preparing the slurry, those described in the section of the negative electrode can be used. Aluminum foil is suitably used as the current collector.

Those known as the electrolytic solution of lithium-ion secondary batteries can be used as the nonaqueous electrolytic solution and nonaqueous polymer electrolyte used in the lithium-ion batteries. For example, those in which lithium salts such as $LiClO_4$, $LiPF_6$, $LiAsF_6$, $LiBF_4$, $LiSO_3CF_3$, and $CH_3SO_3Li$ are dissolved in the following solvents or polymers are used. Examples of the solvent include a nonaqueous solvent such as ethylene carbonate, diethyl carbonate, dimethyl carbonate, ethyl methyl carbonate, propylene carbonate, butylene carbonate, acetonitrile, propionitrile, dimethoxyethane, tetrahydrofuran, and γ-butyrolactone; a gel polymer containing, for example, polyethylene oxide, polyacrylonitrile, polyvinylidene fluoride, and polymethyl methacrylate; and a polymer having an ethylene oxide bond.

Furthermore, a small amount of the additive generally used in the electrolytic solution of a lithium-ion battery may be added to the nonaqueous electrolytic solution. Examples of the substance include vinylene carbonate (VC), biphenyl, propanesultone (PS), fluoroethylene carbonate (FEC), and ethylene sultone (ES). Preferred examples thereof include VC and FEC. The amount to be added is preferably 0.01 to 20% by mass based on 100% by mass of the nonaqueous electrolytic solution.

The separator can be freely selected from materials that can be used in general lithium-ion secondary batteries, including combinations thereof, and examples thereof include microporous films made of polyethylene or polypropylene. In addition, it is also possible to use separators obtained by mixing particles such as $SiO_2$ or $Al_2O_3$ as fillers into such separators, or separators obtained by adhering the particles to the surfaces of such separators.

The battery case is not particularly limited as long as it can accommodate the positive electrode, the negative electrode, the separator, and the electrolytic solution. In addition to those standardized in the industry such as commercially available battery packs, 18650 cylindrical cell, and coin-shaped cells, the battery case, including those packed with aluminum packaging material, for example, can be freely designed and used.

The electrodes may be packed for use after stacked. The single cells can be connected in series and used as batteries or modules.

EXAMPLES

Hereinafter, the present invention will be specifically described with reference to Examples and Comparative Examples, but the present invention is not limited to these Examples.

Physical property measurements and battery evaluations were performed as follows.

[1] Physical Property Measurements

[1-1] X-ray Photoelectron Spectroscopy (XPS)

Using a small spatula, the sample was placed on the adhesive side of a double-sided tape attached onto a Si substrate, spread uniformly so as not to expose the underlying double-sided tape, and lightly pressed down with the small spatula so that the measurement surface was flat to some extent. The range over which the sample was spread was made wider than the measuring range (about 100 μmφ). This was to ensure that only the composite particles were laid down within the measuring range. For this sample, the measurement was carried out by the following method.

[Measuring Apparatus]

Apparatus: PHI Quantera II (manufactured by ULVAC-PHI, INCORPORATED.)

X-ray source: Al monochrome (25 W, 15 kV)

Analytical range: φ100 μm electron and ion neutralization guns: ON

Photoelectron detection angle: 45 degrees

Narrow scan

Pass Energy: 55 eV Step: 0.2 eV Dwell: 20 ms

Sweep time: O (25) C, Si (50)

[Analytical Method]

[Energy Correction]

For the Narrow spectrum, correction was made so that the 1s peak of carbon is at 284.6 eV.

[Ratios of Number of Atoms of C, O, and Si, $A_C$, $A_O$, and $A_{Si}$]

The area ratios of C, O, and Si in the Narrow spectrum were calculated as ratios of the number of atoms. The sum of all ratios of the number of atoms, $A_C$, $A_O$ and $A_{Si}$, for C, O and Si, was set to 1.00.

[Si Species State Ratios $B_{SiO2}$, $B_{SiO}$, and $B_{Si}$]

For the Si 2p Narrow spectrum, peak fitting was carried out using the following method to calculate the Si species state ratios $B_{SiO2}$, $B_{SiO}$, and $B_{Si}$.

(Chemical shift) Si zero-valent=99 eV, Si divalent=101 eV, Si tetravalent=103 eV (Peak fitting method) The full width at half maximum and the peak top were automatically adjusted by analysis software so that the residual difference between the peak fitting result and the measurement result was minimized. Note that the adjustment of the peak tops was carried out with a width of ±0.5 eV for all three width components. The analysis software used was the software accompanying the above measuring apparatus.

Background subtraction method: Shirley method

Function: Gauss-Lorentz

Si zero-valent means so-called simple Si. Si divalent means SiO. Si tetravalent means $SiO_2$. Si monovalent and trivalent were excluded because their intensities are small, which in turn lowers the accuracy of peak fitting. Although Si divalent generally includes silicon carbide as well, the peak shape of the C 1s Narrow spectrum shows no peak shape disturbance (such as shoulder peak or tailing) that is associated with a chemical shift of 282.5 to 283.0 eV, which is derived from silicon carbide, and thus the amount of silicon carbide present was considered to be at or below the lower detection limit. Therefore, the Si divalent peak was considered to mean only SiO.

[1-2] Hydrophobicity

Pure water at the same temperature as room temperature was fed into a 20-mL glass sample bottle (body diameter× height: φ28 mm×61 mm) to a depth of about 1 cm. Here, 0.05 g of the composite particle was measured on a piece of drug packing paper, and the composite particle was slowly fed into the aforementioned sample bottle. At this time, the height from which the composite particle was fed was within 0.5 to 3.0 cm from the water's surface. After the feeding, the sample bottle was left to stand still and the osmosis behavior of the composite particle into the water was observed. The composite particle is considered hydrophobic when it does not reach the bottom of the sample bottle after leaving it to stand for 5 minutes, as confirmed by visual observation. A sample was considered hydrophilic if the powder sank into the water within 5 minutes under the same conditions.

[1-3] True Density Measurement

The sample was vacuum dried at 180° C. for 12 hours, and then the sample was filled in a glove box under a dry argon atmosphere so as to be 40% to 60% of a measurement cell. The cell was tapped 100 times or more, and then the weight of the sample was measured. Thereafter, the sample was taken out to the atmosphere, and dry density measurement by the constant volume expansion method using helium gas was carried out by the following method to calculate the true density.

- Apparatus: AccuPyc® II 1340 Gas Pycnometer manufactured by Micromeritics Instrument Corporation
- Measurement cell: made of aluminum, depth 39.3 mm, inner diameter 18 mm
- Carrier gas: helium gas
- Gas pressure: 19.5 psiG (134.4 kPaG)
- Number of purges during measurement: 200 times
- Temperature: 25° C.+1° C.

[1-4] Raman Si Peak, $I_{Si}/I_G$, and Raman R Value ($I_D/I_G$)

The measurement was carried out under the following conditions.

- Microscopic Raman spectroscopic measuring apparatus: LabRAM® HR Evolution manufactured by HORIBA, Ltd.
- Excitation wavelength: 532 nm
- Exposure time: 10 seconds
- Integration: 2 times
- Diffraction gratings: 300/mm (600 nm)
- Measurement sample: The composite particle is placed on a glass preparation using a small spatula so that the powder was uniformly spread. The range in which the sample was spread was made wider than the measuring range described below.
- Measuring range: length 80 μm×width 100 μm Only the composite particles were laid down within the measuring range.
- Number of points: 100 points were measured with a vertical feed of 17.8 μm and a horizontal feed of 22.2 μm.

A spectrum obtained by averaging them was acquired and the following analysis was performed.

The Si peak at 450 to 495 $cm^{-1}$ in the Raman spectrum was observed.

The intensity of this Si peak was defined as $I_{Si}$ and the ratio thereof to the peak intensity in the vicinity of 1580 $cm^{-1}$, ($I_G$), was defined as ($I_{Si}/I_G$).

The ratio of the peak intensity in the vicinity of 1350 $cm^{-1}$ ($I_D$) to ($I_G$) was defined as R value ($I_D/I_G$).

Note that the height from the baseline to the peak top after the base line had been corrected was taken as the peak intensity.

[1-5] Powder X-ray Diffraction Measurement (Powder XRD)

The sample was filled in a glass sample plate (window length and width: 18 mm×20 mm, depth: 0.2 mm), and measurement was carried out by the following method.

- XRD apparatus: SmartLab® manufactured by Rigaku Corporation
- X-ray source: Cu-Kα radiation
- Kβ line removal method: Ni filter
- X-ray output: 45 kV, 200 mA
- Measurement range: 10.0 to 80.0°
- Scan speed: 10.0°/min The obtained XRD pattern was subjected to background removal, removal of Kα2 component, and smoothing using analysis software (PDXL2, manufactured by Rigaku Corporation), and then subjected to profile fitting to determine the peak position, intensity, and full width at half maximum.

Note that the Si (111) plane has a diffraction peak in the vicinity of 2θ=28°, and the SiC (111) plane has a diffraction peak in the vicinity of 2θ=35°.

[1-6] Particle Size Distribution Measurement

One ultra-small spatula of the sample and two drops of a solution obtained by diluting the original solution of 32 mass& nonionic surfactant (Yashinomi detergent Hi-power manufactured by Saraya Co., Ltd.) by 100 times were added to 15 mL of water, followed by ultrasonic dispersion for 3 minutes. For this dispersion, the measurement was carried out by the following method.

- Apparatus: Laser diffraction particle size distribution analyzer (LMS-2000e) manufactured by Seishin Enterprise Co., Ltd.
- Analysis: The volume-based cumulative particle size distribution was calculated to determine the 50% particle size $D_{V50}$ (μm) and 90% particle size $D_{V90}$ (μm).

[1-7] Silicon Content Rate

For the silicon content rate of the sample, the measurement was carried out under the following conditions.

- X-ray fluorescence apparatus: NEX CG manufactured by Rigaku Corporation
- Tube voltage: 50 kV
- Tube current: 1.00 mA
- Sample cup: φ32, 12 mL, CH1530
- Sample weight: 2 to 3 g
- Sample height: 5 to 18 mm A sample cup was filled with the sample, the measurement was carried out by the above method, and the silicon content rate in the composite particle was calculated in the unit of % by mass using the fundamental parameter method (FP method).

[1-8] Oxygen Content Rate

Into a nickel capsule, 20 mg of the sample was weighed and an oxygen-nitrogen analyzer EMGA®-920 (manufactured by HORIBA, Ltd.) was used to calculate the oxygen content rate in the composite particle in the unit of % by mass. Argon was used as the carrier gas. By dividing the oxygen content rate in the composite particle by the silicon content rate, the oxygen content rate when the silicon content rate in the composite particle was designated as 100% by mass was obtained in the unit of % by mass.

The measurement of the oxygen content rate was performed within two days after production of the composite particle.

[1-9] Scanning Electron Microscope (SEM) and Energy Dispersive X-ray Spectroscopy (EDS)

The sample was loaded on carbon tape, and in the case of particle observation, observation was performed as is. In the case of cross-sectional observation, the sample whose cross-section was processed using a cross-section Polisher® manufactured by JEOL Ltd. The observation and measurement were carried out by the following method.

SEM: scanning electron microscope: Regulus® 8220 (manufactured by Hitachi High-Tech Science Corporation)

EDS: XFlash® 5060FlatQUAD (manufactured by Bruker)

Accelerating voltage: 1 to 20 kV

Observation magnification: 500 to 5000 times (selected as appropriate according to particle size)

[1-10] BET Specific Surface Area and Pore Volume (Nitrogen Adsorption Test)

Using NOVA® 4200e manufactured by Quantachrome Instruments as the measuring apparatus, the sample was placed in a sample cell (9 mm×135 mm) so that the total surface area of the sample was 2 to 60 $m^2$, dried at 300° C. under vacuum conditions for 1 hour, the sample weight was measured, and the measurement was carried out. Nitrogen was used as the gas for measurement.

During the measurement, the set minimum relative pressure was 0.005 and the set maximum relative pressure was 0.995. The BET specific surface area of the porous carbon material was calculated by the BET multipoint method from adsorption isotherm data at a relative pressure of around 0.005 to less than 0.08. The BET specific surface area of the composite particle was calculated by the BET multipoint method from adsorption isotherm data at three points at relative pressures of around 0.1, around 0.2, and around 0.3. The total pore volume $V_{0.99}$ was determined by calculating the adsorption amount at a relative pressure of 0.99 by linear approximation from adsorption isotherm data at two points before and after a relative pressure of 0.99. The pore volume $V_{0.01}$ at a relative pressure of 0.01 was determined by calculating the adsorption amount at a relative pressure of 0.01 by linear approximation from adsorption isotherm data at two points before and after a relative pressure of 0.01.

At this time, the calculation was performed with a nitrogen liquid density of 0.808 ($g/cm^3$), a 1 mol volume of nitrogen in the standard state of 22.4133 L, and a nitrogen atomic weight of 14.0067.

[1-11] Measurement of Polymer Component Content Rate

The measurement was carried out by the following method.

Apparatus for TG-DTA: TG-DTA 2000SE manufactured by NETZSCH Japan K.K.

Sample weight: 10 to 20 mg

Pan for sample: made of alumina

Pan for reference: made of alumina

Gas atmosphere: Ar

Gas flow rate: 100 mL/min

Temperature raising rate: 10° C./min

Measurement temperature range: room temperature to 1000° C.

The polymer component content rate was calculated by using the weight loss due to thermal decomposition from 200° C. to 350° C. as the amount of polymer component.

[2] Measurement of Oxidation Resistance of Composite Particle by Sample Aqueous Dispersion A stirrer and 2 g of pure water were charged into a 20-mL glass sample bottle. 0.05 g of the sample was fed into the bottle, which was then covered with a silicone rubber septum. While stirring with a magnetic stirrer at room temperature (20 to 26° C.), the concentration of hydrogen gas in the gas phase in the sample bottle was measured.

Hydrogen is generated when silicon in the composite particle is oxidized by water. Accordingly, a high concentration of hydrogen gas in the gas phase means that the composite particle is easily oxidized, while a low concentration of hydrogen gas means that the composite particle is unlikely to be oxidized.

For the measurement of hydrogen gas concentration, a real-time mass spectrometer was used. The hydrogen gas concentration was corrected for sensitivity by the nitrogen gas concentration. Also, the same measurement was performed with no sample fed, and the hydrogen gas concentration calculated at that time was corrected as 0% by volume.

Sampling of the gas inside the sample bottle was carried out with the real-time mass spectrometer using a capillary penetrating the septum. In order to keep the air pressure inside the sample bottle constant, the septum was pierced with a syringe needle in addition to the capillary of the real-time mass spectrometer so that room air could be introduced.

Comparison of the hydrogen gas generation concentrations was carried out using the average hydrogen gas concentration from 50 minutes to 60 minutes after the start of the measurement. Since, immediately after the start of the measurement, the object measured was almost the air in the sample bottle, the value after some time from the start of the measurement was used. Note that the sampling flow rate of the real-time mass spectrometer was 1 sccm. Also, in order to prevent the real-time mass spectrometer from sucking the aqueous dispersion of the sample, the sample bottle was placed so that the capillary did not come in contact with the liquid surface.

Real-time mass spectrometer: manufactured by PFEIFFR VACUUM, OMNISTAR® GSD350

[3] Battery Evaluation

[3-1] Preparation of Negative Electrode Sheet

Styrene butadiene rubber (SBR) and carboxymethyl cellulose (CMC) were used as binders.

Specifically, an SBR aqueous dispersion in which SBR having a solid content of 40% by mass had been dispersed and a 2 mass % CMC aqueous solution in which CMC powder had been dissolved were obtained.

A mixture of carbon black (SUPER C45®, manufactured by Imerys Graphite & Carbon) and single-wall type carbon nanotubes (TUBALL® WPB-030, manufactured by OCSiAl) at a mass ratio of 5:1 was prepared as a mixed conductive assistant.

A negative electrode active material was obtained by mixing the composite particle and a graphite particle so that the silicon concentration in the total amount of the negative electrode active material was 5.9% by mass. A slurry for forming a negative electrode mixture layer was obtained by mixing 96.4 parts by mass of the negative electrode active material, 0.6 parts by mass of the mixed conductive assistant, the CMC aqueous solution corresponding to 1.5 parts by mass of CMC solid content, and the SBR aqueous dispersion corresponding to 1.5 parts by mass of SBR solid content, adding an appropriate amount of water for viscosity adjustment, and kneading the mixture with a rotation/revolution mixer (manufactured by THINKY CORPORATION). The slurry concentration was 45 to 55% by mass.

As the graphite particle, artificial graphite was used that have a BET of 2.7 $m^2/g$, a $D_{V10}$ of 7 μm, a $D_{V50}$ of 14 μm, a $D_{V90}$ of 27 μm, a tap density of 0.98 $g/cm^3$, an initial discharge specific capacity of 360 mAh/g, and an initial coulombic efficiency of 92%.

The slurry for forming a negative electrode mixture layer was uniformly applied onto a copper foil having a thickness of 20 μm as a current collector foil using a doctor blade which has a gap of 150 μm, dried on a hot plate, and then vacuum-dried at 70° C. for 12 hours to form a negative electrode mixture layer on the current collector foil. This is referred to as a negative electrode sheet (sheet composed of the negative electrode mixture layer and the current collector foil).

The negative electrode sheet was punched out to 16 mmφ and pressed by a uniaxial pressing machine to adjust the density of the negative electrode mixture layer to 1.6 $g/cm^3$, thereby obtaining a negative electrode.

The electrode density of the negative electrode (negative electrode density) was calculated as follows. The mass and thickness of the negative electrode mixture layer were determined by measuring the mass and thickness of the negative electrode obtained by the above-described method, and subtracting therefrom the mass and thickness of the current collector foil punched out to 16 mmφ, which had been separately measured, and the electrode density (negative electrode density) was calculated from those values.

[3-2] Preparation Coin Battery (Lithium Counter Electrode Cell)

In an insulating gasket made of polypropylene (inner diameter: approximately 18 mm), a separator (polypropylene microporous film) impregnated with an electrolytic solution was sandwiched by the negative electrode described above and a metal lithium foil with a thickness of 1.7 mm punched out to 17.5 mm, and laminated. At this time, the negative electrode mixture layer surface of the negative electrode was laminated so as to face the metal lithium foil with the separator sandwiched therebetween. This was placed in a 2320 coin-shaped cell and sealed with a caulking machine to obtain a test cell (lithium counter electrode cell).

The electrolytic solution in the lithium counter electrode cell used was a solution obtained by mixing 1 part by mass of vinylene carbonate (VC) in 100 parts by mass of a solvent in which ethylene carbonate, ethyl methyl carbonate, and diethyl carbonate had been mixed at a volume ratio of 3:5:2, and further dissolving the electrolyte lithium hexafluorophosphate ($LiPF_6$) therein to a concentration of 1 mol/L.

[3-3] Initial Charge Specific Capacity and Initial Discharge Specific Capacity

The test was carried out using the lithium counter electrode cell. A constant current (CC) charging was carried out from open circuit voltage (OCV) to 0.005 V at a current value corresponding to 0.1 C. At the time point when 0.005 V was reached, the charging was switched to constant voltage (CV) charging. The cutoff condition was set to the time point when the current value was decreased to the value corresponding to 0.005 C. The specific capacity at this time is taken as the initial charge specific capacity. Next, constant current discharging was carried out at a current value corresponding to 0.1 C with an upper limit voltage of 1.5 V. The specific capacity at this time is taken as the initial discharge specific capacity.

The test was carried out in a thermostatic tank set at 25° C. At this time, the "specific capacity" is a value obtained by dividing the capacity by the mass of the negative electrode active material. Also, in the present test, the "current value corresponding to 1 C" is the size of current that can finish discharging the capacity of the negative electrode estimated from the masses of Si and carbon (including graphite) in the negative electrode active material contained in the negative electrode and the theoretical specific capacity (4200 mAh/g and 372 mAh/g, respectively) in 1 hour.

[3-4] Initial Coulombic Efficiency

The initial coulombic efficiency (%) was defined as (initial discharge specific capacity)/(initial charge specific capacity)×100, which is a numerical value expressed as a percentage of the value obtained by dividing the initial discharge specific capacity by the initial charge specific capacity.

[3-5] Silicon Utilization Rate

The silicon utilization rate (%) was defined as a numerical value obtained by calculating the specific capacity of silicon in the composite particle from the initial discharge specific capacity and the composition of the negative electrode active material, and dividing it by the silicon theoretical specific capacity (4200 mAh/g) and expressing the resultant value as a percentage. It is considered that, the closer this value is to 100%, the more effectively the capacity of silicon in the composite particle is being used.

The specific capacity of silicon in the composite particle was calculated using the expression below from the silicon concentration (that is, proportion (% by mass) of silicon) and carbon concentration (that is, proportion (% by mass) of carbon) (proportion (% by mass) of graphite and carbon contained in the composite particle) in the negative electrode active material, as well as the theoretical specific capacity of carbon (372 mAh/g) and the initial discharge specific capacity.

$$\text{Specific capacity of silicon in composite particle} = \left(\text{initial discharge specific capacity} - \left(\text{carbon concentration}/100\right) \times \text{theoretical specific capacity of carbon}\right) / \left(\text{silicon concentration}/100\right)$$

Note that the carbon concentration and silicon concentration in the above expression were calculated from the composition of the negative electrode active material and the composition of the composite particle. Also, the carbon content rate in the carbon material in the composite particle was assumed to be 100% by mass.

Examples 1, 2, 4, 5, and 7 to 11

Porous carbon having the physical properties shown in Table 1 was charged inside a tubular furnace, and after replacing the inside of the tubular furnace with argon, a silicon-containing gas was allowed to flow through the tubular furnace according to the conditions of step (A) shown in Table 1, thereby causing reaction.

Next, the inside of the tubular furnace was replaced with argon and then depressurized, and 300 sccm of gases (hydrocarbon gas and dilution gas) to be used in step (B) shown in Table 1 were allowed to flow to atmospheric pressure (760 torr). Thereafter, reaction was carried out according to the conditions of step (B) shown in Table 1.

Subsequently, the inside of the tubular furnace was replaced with argon, and then gases were allowed to flow (steps C-1 and C-3) or filled (step C-4) in the tubular furnace according to the conditions of step (C) shown in Table 1, thereby causing reaction, and the composite particle was obtained. Step (C) was performed in the following order: step C-1, step C-2, step C-3, and step C-4. For the step not performed, "-" is marked in Table 1. The structure and physical property values of the resulting composite particle are shown in Table 2. The evaluation results are shown in Table 3.

Example 3

Porous carbon having the physical properties shown in Table 1 was charged inside a tubular furnace, and after replacing the inside of the tubular furnace with argon, a silicon-containing gas was allowed to flow through the tubular furnace according to the conditions of step (A) shown in Table 1, thereby causing reaction.

Next, the inside of the tubular furnace was replaced with argon, and then gases (hydrocarbon gas and dilution gas) were allowed to flow through the tubular furnace according to the conditions of step (B) shown in Table 1, thereby causing reaction.

Subsequently, the inside of the tubular furnace was replaced with argon, and then gases were allowed to flow (steps C-1 and C-3) or filled (step C-4) in the tubular furnace according to the conditions of step (C) shown in Table 1, thereby causing reaction, and the composite particle was obtained. Step (C) was performed in the following order: step C-1, step C-2, step C-3, and step C-4. For the step not performed, "-" is marked in Table 1. The structure and physical property values of the resulting composite particle are shown in Table 2. The evaluation results are shown in Table 3.

Example 6

[Production of Inorganic Particle Dispersion]

As the inorganic particle, flake graphite (KS-6, manufactured by Timcal Ltd.) and acetylene black (HS100, manufactured by Denka Company Limited) having an average particle size $D_{V50}$ of 3 μm were prepared. Into 800 g of water, 156 g of flake graphite, 40 g of acetylene black, and 4 g of carboxymethyl cellulose were placed, and the mixture was dispersed and mixed in a bead mill to obtain an inorganic particle dispersion (solid content 20% by mass).

[Production of Polymer-Coated Composite Particle]

7 g of the composite particle obtained in Example 1, 1.98 g of water, 3.84 g of a 2.5 mass % tamarind seed gum aqueous solution, 0.43 g of a 2.5 mass % sorbitol aqueous solution, and 1.60 g of the inorganic particle dispersion were prepared.

Water and the above-described tamarind seed gum aqueous solution were fed into a polyethylene bottle with a lid having an internal volume of 105 mL, and mixed at 1000 rpm for 2 minutes with a rotation/revolution mixer (manufactured by THINKY CORPORATION). The composite particle was added and mixed at 1000 rpm for 2 minutes. The above-described inorganic particle dispersion was added and mixed at 1000 rpm for 2 minutes. The above-described sorbitol aqueous solution was added and mixed at 1000 rpm for 2 minutes. The obtained slurry was spread on a tray made of SUS and dried with a hot air dryer at 150° C. for 5 hours. The dried solid matter was recovered, and aggregated particles were crushed in an agate mortar. When the obtained composite particle was observed by SEM, it was confirmed that flake graphite and acetylene black were present on the surface of the core particle, and a protruding structure was formed by the flake graphite. The polymer component content rate was 1.5% by mass.

The evaluation results for the polymer-coated composite particle are shown in Table 3. For the polymer-coated composite particle, the hydrogen concentration in the gas phase in the sample aqueous dispersion container is lower than in Example 1, indicating improved oxidation resistance compared to the composite particle of Example 1. Due to the polymer coating, the oxygen content rate of the composite particle is slightly increased, resulting in a slight reduction in the initial coulombic efficiency, but the effect of improving oxidation resistance is seen.

Comparative Examples 1 and 4

Porous carbon having the physical properties shown in Table 1 was charged inside a tubular furnace, and after replacing the inside of the tubular furnace with argon, a silicon-containing gas was allowed to flow through the tubular furnace according to the conditions of step (A) shown in Table 1, thereby causing reaction.

Next, the inside of the tubular furnace was replaced with argon, and then, without performing step (B), gases were allowed to flow (steps C-1 and C-3) or filled (step C-4) according to the conditions of step (C) shown in Table 1, thereby causing reaction, and a composite particle was obtained. Step (C) was performed in the following order: step C-1, step C-2, step C-3, and step C-4. For the step not performed, "-" is marked. The structure and physical property values of the composite particle are shown in Table 2. The evaluation results are shown in Table 3.

Comparative Example 2

Porous carbon having the physical properties shown in Table 1 was charged inside a tubular furnace, and after replacing the inside of the tubular furnace with argon, a silicon-containing gas was allowed to flow through the tubular furnace according to the conditions of step (A) shown in Table 1, thereby causing reaction.

Next, the inside of the tubular furnace was replaced with argon and then depressurized, and 300 sccm of gases (hydrocarbon gas and dilution gas) to be used in step (B) shown in Table 1 were allowed to flow to atmospheric pressure (760 torr). Thereafter, reaction was carried out according to the conditions of step (B) shown in Table 1.

Subsequently, the inside of the tubular furnace was replaced with argon, and then gases were allowed to flow (steps C-1 and C-3) or filled (step C-4) in the tubular furnace according to the conditions of step (C) shown in Table 1, thereby causing reaction, and a composite particle was obtained. Step (C) was performed in the following order: step C-1, step C-2, step C-3, and step C-4. For the step not performed, "-" is marked. The structure and physical property values of the composite particle are shown in Table 2. The evaluation results are shown in Table 3.

Comparative Example 3

Porous carbon having the physical properties shown in Table 1 was charged inside a tubular furnace, and after replacing the inside of the tubular furnace with argon, a silicon-containing gas was allowed to flow through the tubular furnace according to the conditions of step (A) shown in Table 1, thereby causing reaction.

Next, the inside of the tubular furnace was replaced with argon, and then gases (hydrocarbon gas and dilution gas) were allowed to flow through the tubular furnace according to the conditions of step (B) shown in Table 1, thereby causing reaction.

Subsequently, the product was cooled to room temperature, thereby obtaining a composite particle. The structure and physical property values of the composite particle are shown in Table 2. Surface carbon coating was confirmed by cross-sectional SEM observation, and its average thickness was 21 nm. The evaluation results are shown in Table 3.

TABLE 1

| | Synthesis method | | | | |
|---|---|---|---|---|---|
| | Raw material (porous carbon) | | | | |
| | BET specific surface area $m^2/g$ | Total pore volume $V_{0.99}$ cc/g | $V_{0.01}$ cc/g | $V_{0.01}/V_{0.99}$ | $DV_{50}$ μm |
| Ex. 1 | 1850 | 0.78 | 0.56 | 0.71 | 7.2 |
| Ex. 2 | 1850 | 0.78 | 0.56 | 0.71 | 7.2 |
| Ex. 3 | 1850 | 0.78 | 0.56 | 0.71 | 7.2 |
| Ex. 4 | 1850 | 0.78 | 0.56 | 0.71 | 7.2 |
| Ex. 5 | 1850 | 0.78 | 0.56 | 0.71 | 7.2 |
| Ex. 7 | 1971 | 1.04 | 0.84 | 0.81 | 6.1 |
| Ex. 8 | 2224 | 1.20 | 0.93 | 0.78 | 4.5 |
| Ex. 9 | 2143 | 0.98 | 0.78 | 0.80 | 6.1 |
| Ex. 10 | 2143 | 0.98 | 0.78 | 0.80 | 6.1 |
| Ex. 11 | 2143 | 0.98 | 0.78 | 0.80 | 6.1 |
| Comp. Ex. 1 | 1850 | 0.78 | 0.56 | 0.71 | 7.2 |
| Comp. Ex. 2 | 1850 | 0.78 | 0.56 | 0.71 | 7.2 |
| Comp. Ex. 3 | 1700 | 0.75 | 0.47 | 0.62 | 7.4 |
| Comp. Ex. 4 | 1987 | 1.09 | 0.83 | 0.76 | 6.1 |

| | Synthesis method | | | |
|---|---|---|---|---|
| | Step (A) | | | |
| | Amount of raw material charged g | Silicon-containing gas | Concentration of silicon-containing gas vol % | Dilution gas type |
| Ex. 1 | 20 | silane | 100 | — |
| Ex. 2 | 10 | silane | 100 | — |
| Ex. 3 | 10 | silane | 100 | — |
| Ex. 4 | 10 | silane | 100 | — |
| Ex. 5 | 10 | silane | 100 | — |
| Ex. 7 | 16.0 | silane | 100 | — |
| Ex. 8 | 6.2 | silane | 46 | argon |
| Ex. 9 | 17 | silane | 100 | — |
| Ex. 10 | 17 | silane | 100 | — |
| Ex. 11 | 17 | silane | 100 | — |
| Comp. Ex. 1 | 20 | silane | 100 | — |
| Comp. Ex. 2 | 10 | silane | 100 | — |
| Comp. Ex. 3 | 10 | silane | 100 | — |
| Comp. Ex. 4 | 20 | silane | 100 | — |

| | Synthesis method | | | |
|---|---|---|---|---|
| | Step (A) | | | |
| | Gas flow rate sccm | Temperature ° C. | Pressure torr | Treatment time h |
| Ex. 1 | 130 | 400 | 760 | 2.43 |
| Ex. 2 | 130 | 400 | 760 | 1.98 |
| Ex. 3 | 130 | 400 | 760 | 2.00 |
| Ex. 4 | 130 | 400 | 760 | 1.97 |
| Ex. 5 | 130 | 400 | 760 | 1.97 |
| Ex. 7 | 130 | 400 | 760 | 3.05 |

TABLE 1-continued

| | | | | |
|---|---|---|---|---|
| Ex. 8 | 130 | 400 | 760 | 3.27 |
| Ex. 9 | 130 | 400 | 760 | 2.88 |
| Ex. 10 | 130 | 400 | 760 | 2.92 |
| Ex. 11 | 130 | 400 | 760 | 2.78 |
| Comp. Ex. 1 | 130 | 400 | 760 | 2.48 |
| Comp. Ex. 2 | 130 | 400 | 760 | 1.92 |
| Comp. Ex. 3 | 130 | 400 | 760 | 2.00 |
| Comp. Ex. 4 | 130 | 400 | 760 | 3.43 |

| Synthesis method | | | | | | | |
|---|---|---|---|---|---|---|---|
| | Step (B) | | | | | | |
| | Hydrocarbon having unsaturated bond | Concentration of hydrocarbon vol % | Dilution gas type | Gas flow rate sccm | Temperature ° C. | Pressure torr | Treatment time h |
| Ex. 1 | acetylene | 20 | argon | 20 | 400 | 760 | 1.3 |
| Ex. 2 | acetylene | 20 | argon | 20 | 300 | 760 | 2.6 |
| Ex. 3 | acetylene | 20 | argon | 100 | 400 | 760 | 2.1 |
| Ex. 4 | acetylene | 20 | argon | 20 | 400 | 760 | 3.6 |
| Ex. 5 | acetylene | 20 | argon | 20 | 400 | 760 | 3.6 |
| Ex. 7 | ethylene | 20 | argon | 20 | 350 | 760 | 1.2 |
| Ex. 8 | ethylene | 20 | argon | 20 | 350 | 760 | 2.6 |
| Ex. 9 | butadiene | 15 | argon | 0 | 350 | 760 | 2.7 |
| Ex. 10 | butadiene | 15 | argon | 0 | 200 | 760 | 1.6 |
| Ex. 11 | butadiene | 15 | argon | 0 | 200→350 | 760 | 2.6 |
| Comp. Ex. 1 | — | — | — | — | — | — | — |
| Comp. Ex. 2 | acetylene | 20 | argon | 20 | 500 | 760 | 1.0 |
| Comp. Ex. 3 | acetylene | 30 | argon | 100 | 650 | 760 | 2.0 |
| Comp. Ex. 4 | — | — | — | — | — | — | — |

| Synthesis method | | | | | | | |
|---|---|---|---|---|---|---|---|
| | Step (C) Step C-1 | | | | | | |
| | Oxidizing gas | Concentration of oxidizing gas vol % | Dilution gas type | Gas flow rate sccm | Temperature ° C. | Pressure torr | Treatment time h |
| Ex. 1 | oxygen | 5 | argon | 1000 | 70 | 760 | 0.5 |
| Ex. 2 | oxygen | 5 | argon | 1000 | 70 | 760 | 0.5 |
| Ex. 3 | oxygen | 5 | argon | 1000 | 70 | 760 | 0.5 |
| Ex. 4 | oxygen | 5 | argon | 1000 | 70 | 760 | 0.5 |
| Ex. 5 | oxygen | 5 | argon | 1000 | 70 | 760 | 0.5 |
| Ex. 7 | oxygen | 5 | argon | 1000 | 70 | 760 | 0.5 |
| Ex. 8 | oxygen | 5 | argon | 1000 | 70 | 760 | 0.5 |
| Ex. 9 | oxygen | 5 | argon | 1000 | 70 | 760 | 0.5 |
| Ex. 10 | oxygen | 5 | argon | 1000 | 70 | 760 | 0.5 |
| Ex. 11 | oxygen | 5 | argon | 1000 | 70 | 760 | 0.5 |
| Comp. Ex. 1 | oxygen | 5 | argon | 1000 | 70 | 760 | 0.5 |
| Comp. Ex. 2 | oxygen | 5 | argon | 1000 | 70 | 760 | 0.5 |
| Comp. Ex. 3 | — | — | — | — | — | — | — |
| Comp. Ex. 4 | oxygen | 5 | argon | 1000 | 70 | 760 | 0.5 |

TABLE 1-continued

| | Synthesis method | | | | |
|---|---|---|---|---|---|
| | Step (C) | | | | |
| | | Step C-3 | | | |
| | Step C-2 Heat treatment | Oxidizing gas | Concentration of oxidizing gas vol % | Dilution gas type | Gas flow rate sccm |
| Ex. 1 | — | oxygen | 10 | argon | 1000 |
| Ex. 2 | — | oxygen | 10 | argon | 1000 |
| Ex. 3 | — | oxygen | 10 | argon | 1000 |
| Ex. 4 | — | oxygen | 10 | argon | 1000 |
| Ex. 5 | 300° C. 10 torr or less (under vacuum) 1 hour | oxygen | 10 | argon | 1000 |
| Ex. 7 | — | oxygen | 10 | argon | 1000 |
| Ex. 8 | — | oxygen | 10 | argon | 1000 |
| Ex. 9 | — | oxygen | 10 | argon | 1000 |
| Ex. 10 | — | oxygen | 10 | argon | 1000 |
| Ex. 11 | — | oxygen | 10 | argon | 1000 |
| Comp. Ex. 1 | — | oxygen | 10 | argon | 1000 |
| Comp. Ex. 2 | — | oxygen | 10 | argon | 1000 |
| Comp. Ex. 3 | — | — | — | — | — |
| Comp. Ex. 4 | — | oxygen | 10 | argon | 1000 |

| | Synthesis method | | | |
|---|---|---|---|---|
| | Step (C) | | | |
| | Step C-3 | | | Step C-4 |
| | Temperature ° C. | Pressure torr | Treatment time h | Pressurization treatment |
| Ex. 1 | 70 | 760 | 0.5 | 25° C. 830 torr 10% oxygen/ 90% argon 15 hours |
| Ex. 2 | 70 | 760 | 0.5 | 25° C. 830 torr 10% oxygen/ 90% argon 15 hours |
| Ex. 3 | 70 | 760 | 0.5 | 25° C. 830 torr 10% oxygen/ 90% argon 15 hours |
| Ex. 4 | 70 | 760 | 0.5 | 25° C. 830 torr 10% oxygen/ 90% argon 15 hours |
| Ex. 5 | 70 | 760 | 0.5 | 25° C. 830 torr 10% oxygen/ 90% argon 15 hours |
| Ex. 7 | 70 | 760 | 0.5 | 25° C. 830 torr 10% oxygen/ 90% argon 15 hours |
| Ex. 8 | 70 | 760 | 0.5 | 25° C. 830 torr 10% oxygen/ 90% argon 15 hours |
| Ex. 9 | 70 | 760 | 0.5 | 25° C. 830 torr 10% oxygen/ 90% argon 15 hours |
| Ex. 10 | 70 | 760 | 0.5 | 25° C. 830 torr 10% oxygen/ 90% argon 15 hours |
| Ex. 11 | 70 | 760 | 0.5 | 25° C. 830 torr 10% oxygen/ 90% argon 15 hours |
| Comp. Ex. 1 | 70 | 760 | 0.5 | 25° C. 830 torr 10% oxygen/ 90% argon 15 hours |
| Comp. Ex. 2 | 70 | 760 | 0.5 | 25° C. 830 torr 10% oxygen/ 90% argon 15 hours |
| Comp. Ex. 3 | — | — | — | — |
| Comp. Ex. 4 | 70 | 760 | 0.5 | 25° C. 830 torr 10% oxygen/ 90% argon 15 hours |

TABLE 2

Composition and structure of composite particle

| | SEM-EDS Si in pores | XPS Narrow spectrum atomic number ratio (atom ratio) | | | |
|---|---|---|---|---|---|
| | — | $A_C$ | $A_O$ | $A_{Si}$ | Total |
| Ex. 1 | Present | 0.45 | 0.10 | 0.45 | 1.00 |
| Ex. 2 | Present | 0.46 | 0.10 | 0.44 | 1.00 |
| Ex. 3 | Present | 0.43 | 0.15 | 0.42 | 1.00 |
| Ex. 4 | Present | 0.49 | 0.09 | 0.42 | 1.00 |
| Ex. 5 | Present | 0.49 | 0.12 | 0.39 | 1.00 |
| Ex. 7 | Present | 0.26 | 0.22 | 0.52 | 1.00 |
| Ex. 8 | Present | 0.49 | 0.12 | 0.39 | 1.00 |
| Ex. 9 | Present | 0.61 | 0.10 | 0.30 | 1.01 |
| Ex. 10 | Present | 0.47 | 0.07 | 0.46 | 1.00 |
| Ex. 11 | Present | 0.63 | 0.05 | 0.32 | 1.00 |
| Comp. Ex. 1 | Present | 0.25 | 0.32 | 0.43 | 1.00 |
| Comp. Ex. 2 | Present | 0.57 | 0.06 | 0.37 | 1.00 |
| Comp. Ex. 3 | Present | 0.93 | 0.03 | 0.04 | 1.00 |
| Comp. Ex. 4 | Present | 0.22 | 0.43 | 0.34 | 0.99 |

Composition and structure of composite particle

| | XPS Si2p spectral state analysis Si species ratio | | | | |
|---|---|---|---|---|---|
| | $B_{SiO2}$ Tetravalent 103 eV | $B_{SiO}$ Divalent 101 eV | $B_{Si}$ Zero-valent 99 eV | Total | $A_C/(A_C + A_{Si} \times (B_{SiO2} + B_{SiO}))$ |
| Ex. 1 | 0.01 | 0.05 | 0.94 | 1.00 | 0.94 |
| Ex. 2 | 0.02 | 0.05 | 0.93 | 1.00 | 0.94 |
| Ex. 3 | 0.04 | 0.08 | 0.88 | 1.00 | 0.90 |
| Ex. 4 | 0.00 | 0.05 | 0.95 | 1.00 | 0.96 |
| Ex. 5 | 0.02 | 0.07 | 0.91 | 1.00 | 0.93 |
| Ex. 7 | 0.08 | 0.11 | 0.81 | 1.00 | 0.72 |
| Ex. 8 | 0.03 | 0.08 | 0.89 | 1.00 | 0.92 |
| Ex. 9 | 0.01 | 0.00 | 0.99 | 1.00 | 1.00 |
| Ex. 10 | 0.01 | 0.04 | 0.95 | 1.00 | 0.95 |
| Ex. 11 | 0.00 | 0.01 | 0.99 | 1.00 | 0.99 |
| Comp. Ex. 1 | 0.23 | 0.08 | 0.69 | 1.00 | 0.65 |
| Comp. Ex. 2 | 0.01 | 0.01 | 0.98 | 1.00 | 0.99 |
| Comp. Ex. 3 | 0.17 | 0.17 | 0.66 | 1.00 | 0.99 |
| Comp. Ex. 4 | 0.43 | 0.06 | 0.51 | 1.00 | 0.57 |

Composition and structure of composite particle

| | Raman spectrum | | | XRD | | |
|---|---|---|---|---|---|---|
| | Raman spectrum | Si peak position | $I_{Si}/I_G$ | Peak derived from graphite | Si (111) plane half-value width | $I_{SiC(111)}/I_{Si(111)}$ |
| | — | $cm^{-1}$ | — | — | deg. | — |
| Ex. 1 | 1.15 | 468 | 0.28 | Absent | 5.5 | 0.00 |
| Ex. 2 | 1.12 | 470 | 0.32 | Absent | 5.4 | 0.00 |
| Ex. 3 | 1.09 | 472 | 0.34 | Absent | 5,4 | 0.00 |
| Ex. 4 | 1.11 | 471 | 0.36 | Absent | 5.3 | 0.00 |
| Ex. 5 | 1.11 | 471 | 0.36 | Absent | 5.3 | 0.00 |
| Ex. 7 | 1.21 | 471 | 0.45 | Absent | 5.4 | 0.00 |
| Ex. 8 | 1.16 | 468 | 0.48 | Absent | 5.5 | 0.00 |
| Ex. 9 | 1.22 | 478 | 0.32 | Absent | 5.4 | 0.00 |
| Ex. 10 | 1.22 | 480 | 0.33 | Absent | 5.5 | 0.00 |
| Ex. 11 | 1.15 | 475 | 0.30 | Absent | 5.4 | 0.00 |
| Comp. Ex. 1 | 1.14 | 472 | 0.28 | Absent | 5.4 | 0.00 |
| Comp. Ex. 2 | 1.12 | 471 | 0.34 | Absent | 5.4 | 0.00 |

TABLE 2-continued

| | | | | | | |
|---|---|---|---|---|---|---|
| Comp. Ex. 3 | 0.94 | 479 | 0.06 | Absent | 4.7 | 0.00 |
| Comp. Ex. 4 | 1.20 | 475 | 0.60 | Absent | 5.4 | 0.00 |

| Composition and structure of composite particle | | | | | |
|---|---|---|---|---|---|
| | Physical property values | | | | |
| | Hydrophobicity/hydrophilicity | Measured length of coating layer: cross-sectional SEM nm | Average aspect ratio | Average circularity | Si content rate % by mass |
| Ex. 1 | Hydrophobicity | Length unmeasurable | 1.01 | 0.99 | 49 |
| Ex. 2 | Hydrophobicity | Length unmeasurable | 1.01 | 0.99 | 50 |
| Ex. 3 | Hydrophobicity | Length unmeasurable | 1.01 | 0.99 | 50 |
| Ex. 4 | Hydrophobicity | Length unmeasurable | 1.01 | 0.99 | 50 |
| Ex. 5 | Hydrophobicity | Length unmeasurable | 1.01 | 0.99 | 50 |
| Ex. 7 | Hydrophobicity | Length unmeasurable | 1.01 | 0.99 | 62 |
| Ex. 8 | Hydrophobicity | Length unmeasurable | 1.01 | 0.99 | 61 |
| Ex. 9 | Hydrophobicity | Length unmeasurable | 1.01 | 0.99 | 61 |
| Ex. 10 | Hydrophobicity | Length unmeasurable | 1.01 | 0.99 | 61 |
| Ex. 11 | Hydrophobicity | Length unmeasurable | 1.01 | 0.99 | 60 |
| Comp. Ex. 1 | Hydrophilicity | Absent | 1.01 | 0.99 | 49 |
| Comp. Ex. 2 | Hydrophilicity | Length unmeasurable | 1.01 | 0.99 | 50 |
| Comp. Ex. 3 | Hydrophobicity | 21 | 1.01 | 0.99 | 47 |
| Comp. Ex. 4 | Hydrophilicity | Absent | 1.01 | 0.99 | 61 |

| Composition and structure of composite particle | | | | | |
|---|---|---|---|---|---|
| | Physical property values | | | | |
| | BET specific surface area $m^2/g$ | $D_{v50}$ μm | $D_{v90}$ μm | True density g/cm3 | Oxygen content rate % by mass |
| Ex. 1 | 2.3 | 7.2 | 11.9 | 1.90 | 0.3 |
| Ex. 2 | 1.0 | 7.2 | 11.9 | 1.89 | 0.4 |
| Ex. 3 | 1.4 | 7.2 | 12.0 | 1.89 | 0.6 |
| Ex. 4 | 1.9 | 7.2 | 12.1 | 1.89 | 0.5 |
| Ex. 5 | 1.9 | 7.2 | 12.1 | 1.89 | 0.5 |
| Ex. 7 | 1.3 | 6.0 | 8.7 | 1.90 | 0.3 |
| Ex. 8 | 12.4 | 3.9 | 7.9 | 1.94 | 0.8 |
| Ex. 9 | 2.5 | 6.0 | 8.6 | 1.95 | 0.7 |
| Ex. 10 | 4.1 | 5.9 | 8.6 | 1.95 | 0.8 |
| Ex. 11 | 13.3 | 2.8 | 8.1 | 1.92 | 0.7 |
| Comp. Ex. 1 | 1.0 | 7.2 | 12.1 | 1.91 | 0.8 |
| Comp. Ex. 2 | 1.2 | 7.2 | 12.3 | 2.01 | 0.7 |
| Comp. Ex. 3 | 4.4 | 7.4 | 14.0 | 2.03 | 2.0 |
| Comp. Ex. 4 | 4.9 | 5.8 | 8.6 | 1.96 | 1.7 |

TABLE 3

| | Oxidation resistance Average hydrogen gas concentration (average of 50 to 60 min) vol % | Battery evaluation Negative electrode active material Mass ratio of composite particle | Mass ratio of graphite | Total |
|---|---|---|---|---|
| Ex. 1 | 0.0027 | 0.120 | 0.880 | 1.000 |
| Ex. 2 | 0.0024 | 0.119 | 0.881 | 1.000 |
| Ex. 3 | 0.0050 | 0.119 | 0.881 | 1.000 |
| Ex. 4 | 0.0050 | 0.119 | 0.881 | 1.000 |
| Ex. 5 | 0.0010 | 0.119 | 0.881 | 1.000 |
| Ex. 6 | 0.0017 | 0.124 | 0.876 | 1.000 |
| Ex. 7 | 0.0032 | 0.095 | 0.905 | 1.000 |
| Ex. 8 | 0.0050 | 0.097 | 0.903 | 1.000 |
| Ex. 9 | 0.0070 | 0.097 | 0.903 | 1.000 |
| Ex. 10 | 0.0065 | 0.097 | 0.903 | 1.000 |
| Ex. 11 | 0.0084 | 0.099 | 0.901 | 1.000 |
| Comp. Ex. 1 | 0.0166 | 0.120 | 0.880 | 1.000 |
| Comp. Ex. 2 | 0.0136 | 0.119 | 0.881 | 1.000 |
| Comp. Ex. 3 | 0.0010 | 0.125 | 0.875 | 1.000 |
| Comp. Ex. 4 | 0.0450 | 0.097 | 0.903 | 1.000 |

| | Battery evaluation Composition of negative electrode active material Si % by mass | C % by mass | O % by mass | Battery characteristics Initial discharge specific capacity mAh/g | Initial charge specific capacity mAh/g | Initial coulombic efficiency | Silicon utilization rate |
|---|---|---|---|---|---|---|---|
| Ex. 1 | 5.9% | 94.1% | 0.0% | 55 | 589 | 93.5% | 81% |
| Ex. 2 | 5.9% | 94.0% | 0.0% | 555 | 593 | 93.6% | 82% |
| Ex. 3 | 5.9% | 94.0% | 0.1% | 556 | 596 | 93.3% | 83% |
| Ex. 4 | 5.9% | 94.0% | 0.1% | 554 | 593 | 93.4% | 82% |
| Ex. 5 | 5.9% | 94.0% | 0.1% | 554 | 592 | 93.6% | 82% |
| Ex. 6 | 5.9% | 93.9% | 0.1% | 553 | 595 | 92.9% | 82% |
| Ex. 7 | 5.9% | 94.1% | 0.0% | 555 | 593 | 93.6% | 83% |
| Ex. 8 | 5.9% | 94.0% | 0.1% | 564 | 601 | 93.8% | 86% |
| Ex. 9 | 5.9% | 94.0% | 0.1% | 550 | 587 | 93.7% | 81% |
| Ex. 10 | 5.9% | 94.0% | 0.1% | 550 | 582 | 93.6% | 81% |
| Ex. 11 | 5.9% | 94.0% | 0.1% | 560 | 601 | 93.2% | 84% |
| Comp Ex. 1 | 5.9% | 94.0% | 0.1% | 555 | 596 | 93.1% | 83% |
| Comp. Ex. 2 | 5.9% | 94.0% | 0.1% | 538 | 578 | 93.1% | 76% |
| Comp. Ex. 3 | 5.9% | 93.9% | 0.3% | 526 | 575 | 91.5% | 71% |
| Comp. Ex. 4 | 5.9% | 93.9% | 0.2% | 545 | 581 | 93.8% | 79% |

Here, while measuring the average hydrogen gas concentration when each sample was immersed in water, the battery characteristics of composite particles and polymer-coated composite particle not immersed in water were evaluated.

Also, as mentioned at the beginning of "Technical Problem", it is obvious that the irreversible capacity is larger and the initial coulombic efficiency is lower for oxidized Si/C particles, and therefore, no experiments were carried out to demonstrate this again.

The composite particles of Examples 1 to 5 and 7 to 11 and the polymer-coated composite particle of Example 6 have lower hydrogen concentrations in the gas phase in the sample aqueous dispersion container and higher oxidation resistance compared to the products of Comparative Examples 1, 2, and 4.

Example 5 includes a heat treatment step (step C-2) in step (C). Therefore, the hydrogen concentration in the gas phase in the sample aqueous dispersion container is lower than in Example 4, which did not include step C-2. The value of $A_C/(A_C+A_{Si}\times(B_{SiO2}+B_{SiO}))$ is smaller in Example 5 than in Example 4, suggesting that the oxygen content rate in the coating layer is high in Example 5. Comparative Examples 1, 2 and 4 have high hydrogen concentrations and low oxidation resistance. This is because the coating layer is absent or insufficient.

Since the composite particles and the polymer-coated composite particle in Examples can suppress oxidation during water dispersion, it is considered that they also have oxidation resistance during storage in the air.

Also, as for the battery characteristics, the composite particles of Examples 1 to 5 and 7 to 11 and the polymer-coated composite particle of Example 6 have higher silicon utilization rates than the products of Comparative Examples 2 and 3, and can effectively use silicon in the composite particles. It is considered that, in Comparative Examples 2 and 3, the reaction temperatures in step (B) were high and silicon carbide was produced, and thus the amount of silicon that can perform charging and discharging was decreased, thereby lowering the silicon utilization rate.

INDUSTRIAL APPLICABILITY

The composite particle of the present invention can be suitably used as, for example, a negative electrode active material that constitutes the negative electrode mixture layer of lithium-ion secondary batteries. The lithium-ion secondary battery of the present invention can be suitably used in applications that require high capacity and high output, such as IT devices including smartphones and tablet PCs, vacuum cleaners, electric tools, electric bicycles, drones, and automobiles.

The invention claimed is:

1. A composite particle comprising a particle comprising a carbon material and silicon, and a coating layer comprising carbon and oxygen on the surface of the particle, wherein the composite particle has a true density according to dry density measurement using helium gas of 1.80 g/cm$^3$ or more and 1.99 g/cm$^3$ or less;

in the Raman spectrum of the composite particle, a peak is present at 450 to 495 cm$^{-1}$, and when the intensity of the peak is defined as $I_{Si}$ and the intensity of the G band (peak intensity in the vicinity of 1580 cm$^{-1}$) is defined as $I_G$, $I_{Si}/I_G$ is 1.3 or less; and when the ratios of the number of atoms of Si, O, and C according to the Narrow spectrum of X-ray photoelectron spectroscopy for the composite particle are defined as $A_{Si}$, $A_O$, and $A_C$, respectively, and when, among the Si species ratios according to Si2p spectral state analysis, the ratios of $SiO_2$ and SiO are defined as $B_{SiO2}$ and $B_{SiO}$, respectively, $A_{Si}$ is 0.05 or more, and at least one of the following expressions (1) and (2) is satisfied:

$$Y \geq 0.75 \tag{1}$$

$$Y \geq -0.32X + 0.81 \tag{2}$$

wherein in expressions (1) and (2), $X=I_{Si}/I_G$ and $Y=A_C/(A_C+A_{Si}\times(B_{SiO2}+B_{SiO}))$.

2. The composite particle according to claim 1, wherein $I_{Si}/I_G$ is 0.64 or less and the expression (1) is satisfied.

3. The composite particle according to claim 1, wherein the carbon material is porous carbon and silicon is contained in at least part of pores of the porous carbon.

4. The composite particle according to claim 1, wherein the coating layer is thin to the extent that it cannot be substantially measured by cross-sectional observation with an electron microscope.

5. The composite particle according to claim 1, wherein, in the XRD pattern according to powder XRD using a Cu-Kα radiation, the full width at half maximum of Si (111) plane peak is 3.0° or more, (peak intensity of SiC (111) plane)/(peak intensity of Si (111) plane) is 0.01 or less, and the R value according to the Raman spectrum is 0.26 or more and less than 1.34.

6. The composite particle according to claim 1, wherein the composite particle is hydrophobic.

7. The composite particle according to claim 1, containing substantially no graphite inside.

8. The composite particle according to claim 1, wherein the composite particle has a 50% particle size in the volume-based cumulative particle size distribution, $D_{V50}$, of 1.0 to 30.0 μm.

9. The composite particle according to claim 1, wherein the composite particle has a silicon content rate of 30% by mass or more and 80% by mass or less, and an oxygen content rate of 4.0% by mass or less.

10. A method for producing a composite particle, comprising:

step (A) of contacting porous carbon with a silicon-containing gas to deposit silicon in pores and on the surface of the porous carbon, thereby obtaining a Si/C particle;

step (B) of contacting the Si/C particle with a gas containing a hydrocarbon having an unsaturated bond at 400° C. or lower; and step (C) of oxidizing a hydrocarbon-containing layer obtained in the step (B).

11. The method for producing a composite particle according to claim 10, wherein the step (A) and the step (B) are carried out in succession.

12. The method for producing a composite particle according to claim 10, which produces a composite particle comprising a particle comprising a carbon material and silicon, and a coating layer comprising carbon and oxygen on the surface of the particle, wherein the composite particle has a true density according to dry density measurement using helium gas of 1.80 g/cm$^3$ or more and 1.99 g/cm$^3$ or less;

in the Raman spectrum of the composite particle, a peak is present at 450 to 495 cm$^{-1}$, and when the intensity of the peak is defined as $I_{Si}$ and the intensity of the G band (peak intensity in the vicinity of 1580 cm$^{-1}$) is defined as $I_G$, $I_{Si}/I_G$ is 1.3 or less; and when the ratios of the number of atoms of Si, O, and C according to the Narrow spectrum of X-ray photoelectron spectroscopy for the composite particle are defined as $A_{Si}$, $A_O$, and $A_C$, respectively, and when, among the Si species ratios according to Si2p spectral state analysis, the ratios of $SiO_2$ and SiO are defined as $B_{SiO2}$ and $B_{SiO}$, respectively, $A_{Si}$ is 0.05 or more, and at least one of the following expressions (1) and (2) is satisfied:

$$Y \geq 0.75 \tag{1}$$

$$Y \geq -0.32X + 0.81 \tag{2}$$

wherein in expressions (1) and (2), $X=I_{Si}/I_G$ and $Y=A_C/(A_C+A_{Si}\times(B_{SiO2}+B_{SiO}))$.

13. A polymer-coated composite particle comprising: the composite particle according to claim 1; and an inorganic particle-containing polymer component coating layer formed on at least part of the surface thereof, wherein the inorganic particle-containing polymer component coating layer comprises an inorganic particle composed of one or more selected from graphite and carbon black, and a polymer component, and has a polymer component content rate of 0.1 to 10.0% by mass.

14. A negative electrode active material comprising (i) the polymer-coated composite particle according to claim 13 or (ii) a composite particle comprising a particle comprising a carbon material and silicon, and a coating layer comprising carbon and oxygen on the surface of the particle, wherein the composite particle has a true density according to dry density measurement using helium gas of 1.80 g/$cm^3$ or more and 1.99 g/$cm^3$ or less;

in the Raman spectrum of the composite particle, a peak is present at 450 to 495 $cm^{-1}$, and when the intensity of the peak is defined as $I_{Si}$ and the intensity of the G band (peak intensity in the vicinity of 1580 $cm^{-1}$) is defined as $I_G$, $I_{Si}/I_G$ is 1.3 or less; and when the ratios of the number of atoms of Si, O, and C according to the Narrow spectrum of X-ray photoelectron spectroscopy for the composite particle are defined as $A_{Si}$, $A_O$, and $A_C$, respectively, and when, among the Si species ratios according to Si2p spectral state analysis, the ratios of $SiO_2$ and SiO are defined as $B_{SiO2}$ and $B_{SiO}$, respectively, $A_{Si}$ is 0.05 or more, and at least one of the following expressions (1) and (2) is satisfied:

$$Y \geq 0.75 \quad (1)$$

$$Y \geq -0.32X + 0.81 \quad (2)$$

wherein in expressions (1) and (2), $X=I_{Si}/I_G$ and $Y=A_C/(A_C+A_{Si}\times(B_{SiO2}+B_{SiO}))$.

15. A negative electrode mixture layer comprising the negative electrode active material according to claim 14.

16. A lithium-ion secondary battery comprising the negative electrode mixture layer according to claim 15.

* * * * *